(12) United States Patent
Shibata et al.

(10) Patent No.: US 8,932,754 B2
(45) Date of Patent: Jan. 13, 2015

(54) ELECTRODE STRUCTURE AND METHOD OF MANUFACTURING THE SAME, AND BATTERY AND METHOD OF MANUFACTURING THE SAME

(75) Inventors: Hironori Shibata, Fukushima (JP);
Akira Sasaki, Fukushima (JP);
Kazuhiko Soji, Fukushima (JP)

(73) Assignee: Sony Corporation (JP)

( * ) Notice: Subject to any disclaimer, the term of this patent is extended or adjusted under 35 U.S.C. 154(b) by 1516 days.

(21) Appl. No.: 12/036,721

(22) Filed: Feb. 25, 2008

(65) Prior Publication Data
US 2008/0206640 A1 Aug. 28, 2008

(30) Foreign Application Priority Data
Feb. 26, 2007 (JP) ................. 2007-045299

(51) Int. Cl.
*H01M 4/02* (2006.01)
(52) U.S. Cl.
USPC ............................ 429/209; 429/246; 29/623.2
(58) Field of Classification Search
USPC .................................. 429/209, 246; 29/623.2
See application file for complete search history.

(56) References Cited

U.S. PATENT DOCUMENTS

| | | | | |
|---|---|---|---|---|
| 5,476,734 A * | 12/1995 | Pulley et al. | ................... | 429/244 |
| 2005/0123827 A1* | 6/2005 | Kang et al. | ................... | 429/149 |
| 2010/0285352 A1* | 11/2010 | Juzkow et al. | ................. | 429/163 |

FOREIGN PATENT DOCUMENTS

| | | |
|---|---|---|
| JP | 02-223153 | 9/1990 |
| JP | 05-062666 | 3/1993 |
| JP | 10-302753 | 11/1998 |
| JP | 2003-077448 | 3/2003 |

OTHER PUBLICATIONS

Japanese Patent Office corresponding to Japanese Serial No. P2007-045299 dated Jul. 28, 2009.
Official Action (with English translation) for Korean Patent Application No. 10-2008-0016267 dated Oct. 31, 2014, 5 pages.

* cited by examiner

*Primary Examiner* — Alix Echelmeyer
(74) *Attorney, Agent, or Firm* — Sheridan Ross P.C.

(57) ABSTRACT

An electrode capable of preventing variations in electrical performance to stabilize performance and improve yields is provided. An electrode structure includes: an electrode including an current collector and an active material layer arranged on the current collector; and an electrode lead arranged on the active material layer, wherein a hole is arranged so as to penetrate the electrode and the electrode lead, and the electrode and the electrode lead are folded back around the hole in a direction away from the hole so that the electrode is placed inside, and the thickness of the active material layer in a region where the electrode lead is not arranged is uniform, and the thickness of the active material layer in a region where the electrode lead is arranged is nonuniform.

10 Claims, 14 Drawing Sheets

ELECTRODE STRUCTURE AND METHOD OF MANUFACTURING THE SAME, AND BATTERY AND METHOD OF MANUFACTURING THE SAME

CROSS REFERENCES TO RELATED APPLICATIONS

The present invention contains subject matter related to Japanese Patent Application JP 2007-045299 filed in the Japanese Patent Office on Feb. 26, 2007, the entire contents of which being incorporated herein by reference.

BACKGROUND OF THE INVENTION

1. Field of the Invention

The present invention relates to an electrode structure including an electrode and an electrode lead and a method of manufacturing the same, and a battery including an electrode structure and a method of manufacturing the same.

2. Description of the Related Art

In recent years, portable electronic devices such as camera-integrated VTRs (videotape recorders), cellular phones, or laptop computers are widely used, and size and weight reduction in the portable electronic devices and an increase in longevity of the portable electronic devices have been strongly demanded. Accordingly, as power sources for the portable electronic devices, the development of batteries, specifically lightweight secondary batteries capable of being used repeatedly at a high energy density have been promoted.

Among them, a secondary battery (a so-called lithium-ion secondary battery) using insertion and extraction of lithium for charge-discharge reaction holds great promise, because the secondary battery can obtain a large energy density, compared to a lead-acid battery or a nickel-cadmium battery.

The lithium-ion secondary battery includes a cathode structure including a cathode and a cathode lead attached to the cathode and an anode structure including an anode and an anode lead attached to the anode as electrode structures. The cathode and the anode both have a configuration in which an active material layer is arranged on a current collector. As a typical example of the lithium-ion secondary battery, a lithium-ion secondary battery using a lithium-containing complex oxide such as lithium cobalt oxide as a cathode active material and a carbon material as an anode active material is known, and these electrodes are formed by a so-called coating method. The coating method is a method of forming an active material layer by dissolving a powdery active material as well as a binder or the like in an organic solvent to form mixture slurry, and then coating a current collector with the mixture slurry, and drying the mixture slurry.

In the coating type electrode, when an electrode lead is bonded to an active material layer by welding, material properties of the electrode lead and the active material layer are not compatible, so there is a tendency that bonding strength is reduced, and the electrical resistance of a bonding part is increased. In this case, internal resistance is increased, so capacity characteristics or cycle characteristics easily decline.

Therefore, in the case where the coating type electrode is used, the current collector is intermittently coated with the mixture slurry to pattern-form the active material layer, so the current collector has a coated portion and an uncoated portion, thereby the electrode lead is bonded to an exposed surface of the uncoated portion of the current collector.

Recently, as portable electronic devices have become more sophisticated and multifunctional, a further increase in capacity has been demanded. Therefore, instead of a carbon material, it is considered to use silicon or the like as an anode active material. The theoretical capacity of silicon (4199 mAh/g) is much larger than the theoretical capacity of graphite (372 mAh/g), so a significant increase in capacity can be expected.

Moreover, in the case where the above-described silicon or the like is used as an active material, recently, it is considered to form an active material layer by a vapor-phase method, a liquid-phase method, a spraying method or the like instead of the coating method. By those methods, adhesion between the current collector and the active material layer is improved, and electrical conductivity between them is extremely increased, so an increase in capacity is expected.

However, in the case where a vapor-phase method or the like is used, the active material layer is formed on the whole surface of the current collector, so unlike the case where the coating method is used, it is difficult to pattern-form the active material layer. Therefore, to bond the electrode lead to the current collector, it is considered that after the active material layer is formed, a part of the active material layer is removed to expose the current collector. However, to remove the active material layer after forming the active material layer, a removing step is further necessary, so the number of steps is increased.

In addition to the above methods, to forcedly bond the electrode lead to the current collector without pattern-forming the active material layer, it is considered to use a typical bonding method such as a caulking method, a resistance welding method, an ultrasonic welding method or the like.

As a method of attaching the electrode lead to the electrode, some other methods are proposed. More specifically, to improve current collecting efficiency, productivity and yields, a method of attaching a lead plate for current collecting to an electrode plate, which is formed by filling a porous material mat with a paste-form active material, by caulking is known (for example, refer to Japanese Unexamined Patent Application Publication No. H02-223153). Moreover, to reduce the weight of a battery and obtain safety, a method in which a current collector is a layered body including a resin film and an electron-conductive thin film, and a lead is attached to the electron-conductive thin film is known (for example, refer to Japanese Unexamined Patent Application Publication No. H10-302753). In this case, the lead is fixed by a fixing means which does not cause dissolution of the electron-conductive thin film.

SUMMARY OF THE INVENTION

A caulking method is a method of fixing an electrode and an electrode lead by physically deforming them, and is one of useful bonding methods. However, a caulking method in related arts does not have an issue in terms of fixing the electrode lead to the electrode; however, the caulking method in related arts is not sufficient in terms of securing electrical conduction between them. It is because when an active material layer is inserted between the current collector and the electrode lead, the active material layer interferes with electrical conduction between them. Thereby, in the caulking method in related arts, electrical performance such as electrical conductivity easily varies due to a bonding state between the electrode and the electrode lead, so there is an issue that the performance or yields of a battery using the caulking method in related arts is not sufficient.

In view of the foregoing, it is desirable to provide an electrode capable of preventing variations in electrical performance to stabilize performance and improve yields, and a method of manufacturing the same, and a battery and a method of manufacturing the same.

According to an embodiment of the invention, there is provided an electrode structure including: an electrode including an current collector and an active material layer arranged on the current collector; and an electrode lead arranged on the active material layer, wherein a hole is arranged so as to penetrate the electrode and the electrode lead, and the electrode and the electrode lead are folded back around the hole in a direction away from the hole. In a first electrode structure, the electrode and the electrode lead are folded back so that the electrode is placed inside, and the thickness of the active material layer in a region where the electrode lead is not arranged is uniform, and the thickness of the active material layer in a region where the electrode lead is arranged is nonuniform. In a second electrode structure, the electrode and the electrode lead are folded back so that the electrode is placed inside, and a folded-back portion of the electrode lead makes contact with the current collector exposed at a tip of a folded-back portion of the electrode. In a third electrode structure, the electrode and the electrode lead are folded back so that the electrode lead is placed inside, and a folded-back portion of the electrode lead makes contact with the current collector exposed at a tip of a folded-back portion of the electrode.

According to an embodiment of the invention, there is provided a method of manufacturing an electrode structure, the electrode structure including an electrode which includes a current collector and an active material layer arranged on the current collector, and an electrode lead arranged on the active material layer. A step of caulking the electrode and the electrode lead includes: a step of penetrating the electrode lead and the electrode by a punching tool to form a hole, thereby folding the electrode lead and the electrode around the hole in a penetrating direction, and a step of folding back a folded portion of the electrode and a folded portion of the electrode lead in a direction away from the hole. In a first method of manufacturing an electrode structure, the electrode lead and the electrode are penetrated in this order by a punching tool, and they are folded so that the electrode is placed inside, and a folded portion of the electrode and a folded portion of the electrode lead are folded back with the punching tool passing through the hole. A second method of manufacturing an electrode structure, the electrode lead and the electrode are penetrated in this order by a punching tool through the use of the electrode having an opening so that the punching tool passes through the opening, and they are folded so that the electrode is placed inside. In a third method of manufacturing an electrode structure, the electrode and the electrode lead are penetrated in this order by a punching tool, and they are folded so that the electrode lead is placed inside.

According to an embodiment of the invention, there is provided a battery including: an electrode structure; and an electrolytic solution. The electrode structure includes an electrode including a current collector and an active material layer arranged on the current collector, and an electrode lead arranged on the active material layer, and a hole is arranged by penetrating the electrode and the electrode lead, and the electrode and the electrode lead are folded back around the hole in a direction away from the hole. In a first battery, the electrode and the electrode lead are folded back so that the electrode is placed inside, and the thickness of the active material layer in a region where the electrode lead is not arranged is uniform, and the thickness of the active material layer in a region where the electrode lead is arranged is nonuniform. In a second battery, the electrode and the electrode lead are folded back so that the electrode is placed inside, and a folded-back portion of the electrode lead makes contact with the current collector exposed at a tip of a folded-back portion of the electrode. In a third battery, the electrode and the electrode lead are folded back so that the electrode lead is placed inside, and a folded-back portion of the electrode lead makes contact with the current collector exposed at a tip of a folded-back portion of the electrode.

According to an embodiment of the invention, there is provided a method of manufacturing a battery, the battery including an electrode structure and an electrolytic solution, the electrode structure including an electrode which includes a current collector and an active material layer arranged on the current collector, and an electrode lead arranged on the active material layer. A step of caulking the electrode and the electrode lead includes: a step of penetrating the electrode lead and the electrode by a punching tool to form a hole, thereby folding the electrode lead and the electrode around the hole in a penetrating direction, and a step of folding back a folded portion of the electrode and a folded portion of the electrode lead in a direction away from the hole. In a first method of manufacturing a battery, the electrode lead and the electrode are penetrated in this order by a punching tool, and they are folded so that the electrode is placed inside, and a folded portion of the electrode and a folded portion of the electrode lead are folded back with the punching tool passing through the hole. In a second method of manufacturing a battery, the electrode lead and the electrode are penetrated in this order by a punching tool through the use of the electrode having an opening so that the punching tool passes through the opening, and they are folded so that the electrode is placed inside. In a third method of manufacturing a battery, the electrode and the electrode lead are penetrated in this order by a punching tool, and they are folded so that the electrode lead is placed inside.

In the first electrode structure or the first method of manufacturing an electrode structure according to the embodiment of the invention, a hole is formed by penetrating the electrode lead and the electrode in this order by a punching tool, and after the electrode lead and the electrode are folded around the hole in a penetrating direction so that the electrode is placed inside, they are folded back in a direction away from the hole with the punching tool passing through the hole. Thereby, the thickness of the active material layer in a region where the electrode lead is not arranged is uniform, and the thickness of the active material layer in a region where the electrode lead is arranged is nonuniform. In this case, for example, when the electrode is buckled in the region where the electrode lead is arranged so as to be multiply folded, the thickness of the active material layer is locally reduced at a point where the electrode extends, so at the point, the electrode lead comes closer to the current collector. Moreover, the active material layer is intermittently arranged, so the electrode lead makes contact with the current collector at a point where the active material layer is not arranged as a contact point. Therefore, the electrode and the electrode lead are sufficiently caulked, and sufficient electrical conduction between them can be obtained, so variations in electrical performance such as electrical conductivity can be prevented. Thereby, in a battery using the first electrode structure or a method of manufacturing a battery using the first method of manufacturing an electrode structure, variations in electrical performance such as capacity characteristics can be prevented to stabilize performance and improve yields.

In the second electrode structure or the second method of manufacturing an electrode structure according to the embodiment of the invention, a hole is formed by penetrating the electrode lead and the electrode having an opening in this order by a punching tool so that the punching tool passes through the opening, and after the electrode lead and the electrode are folded around the hole in a penetrating direction so that the electrode is placed inside, they are folded back in a direction away from the hole. Thereby, a folded-back portion of the electrode lead makes contact with the current collector exposed at a tip of a folded-back portion of the electrode. Therefore, the electrode and the electrode lead are sufficiently caulked, and sufficient electrical conduction between them can be obtained, so variations in electrical performance such as electrical conductivity can be prevented. Thereby, in a battery using the second electrode structure or a method of manufacturing a battery using the second method of manufacturing an electrode structure, variations in electrical performance such as capacity characteristics can be prevented to stabilize performance and improve yields.

In the third electrode structure or the third method of manufacturing an electrode structure according to the embodiment of the invention, a hole is formed by penetrating the electrode and the electrode lead in this order by a punching tool, and after the electrode and the electrode lead are folded around the hole in a penetrating direction so that the electrode lead is placed inside, they are folded back in a direction away from the hole. Thereby, a folded-back portion of the electrode lead makes contact with the current collector exposed at a tip of a folded-back portion of the electrode. Therefore, the electrode and the electrode lead are sufficiently caulked, and sufficient electrical conduction between them can be obtained, so variations in electrical performance such as electrical conductivity can be prevented. Thereby, in a battery using the third electrode structure or a method of manufacturing a battery using the third method of manufacturing an electrode structure, variations in electrical performance such as capacity characteristics can be prevented to stabilize performance and improve yields.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1A:
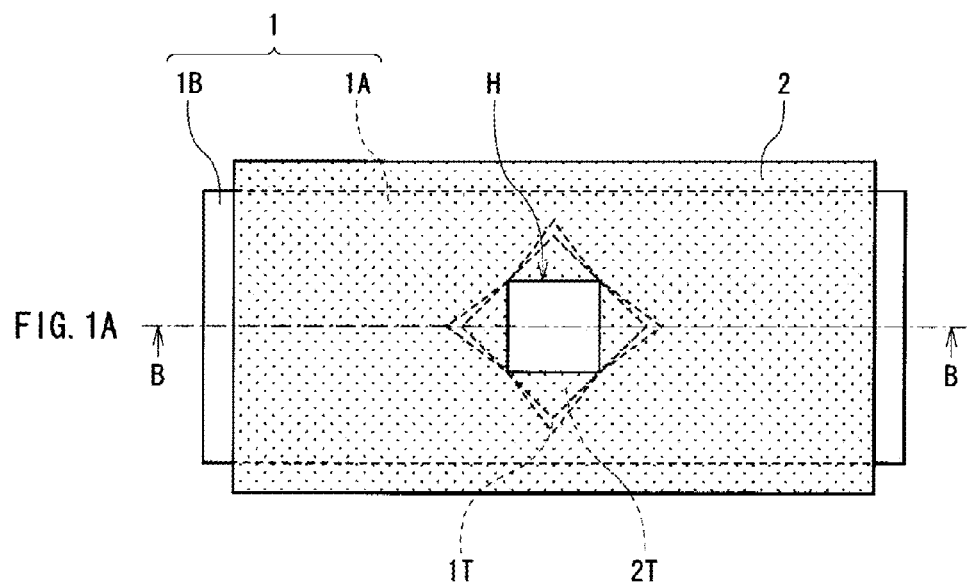
FIGS. 1A and 1B are a plan view and a sectional view showing the configuration of an electrode structure according to a first embodiment of the invention.
Figure 1B:
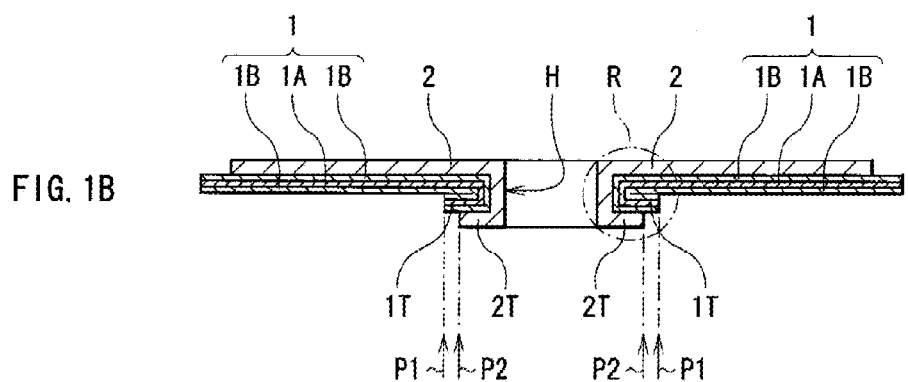

FIGS. 1A and 1B show the configuration of an electrode structure according to a first embodiment of the invention, and FIG. 1A shows a plan view and FIG. 1B shows a sectional view taken along a line B-B of FIG. 1A. Hereinafter a dimension in the long side direction of the electrode structure is referred to as "length", and a dimension in the short side direction is referred to as "width".

The electrode structure is used as a cathode structure or an anode structure in an electrochemical device such as a battery, and as shown in FIGS. 1A and 1B, the electrode structure includes an electrode 1 and an electrode lead 2 attached to the electrode 1. The electrode 1 includes a current collector 1A and an active material layer 1B arranged on the current collector 1A, and the electrode lead 2 is arranged on the active material layer 1B.

The current collector 1A is made of a metal material having good electrical conductivity, electrochemical stability and mechanical strength, for example, metal foil having a pair of facing surfaces. Examples of the metal material include aluminum, copper and the like. However, the metal material can be freely selected depending on conditions such as the kind or application of the electrode 1.

In particular, as the metal material, a metal material including one kind or two or more kinds of metal elements which does not form an intermetallic oxide with an electrode reactant is preferable. It is because when the metal material forms an intermetallic oxide with the electrode reactant, during the operation of an electrochemical device (for example, during charge and discharge of a battery), the current collector 1A is susceptible to a stress caused by swelling and shrinkage of the active material layer 1B, so a current collecting property may decline, or the active material layer 1B may be peeled.

Moreover, as the metal material, a metal material including one kind or two or more kinds of metal elements which is alloyed with the active material layer 1B is preferable. It is because adhesion between the current collector 1A and the active material layer 1B is improved, so the active material layer 1B has resistance to peeling.

The current collector 1A may have a single layer configuration or a multilayer configuration. In the case where the current collector 1A has a multilayer configuration, it is preferable that a layer adjacent to the active material layer 1B is made of a metal material which is alloyed with the active material layer 1B, and a layer not adjacent to the active material layer 1B is made of another metal material.

The surface of the current collector 1A is preferably roughened. It is because adhesion between the current collector 1A and the active material layer 1B is improved by a so-called anchor effect. In this case, at least a surface of a portion adjacent to the active material layer 1B of the current collector 1A may be roughened. As a roughening method, for example, a method of forming fine particles by electrolytic treatment or the like is cited. The electrolytic treatment is a method of forming asperities by forming fine particles on a surface of metal by an electrolytic method in an electrolytic bath. In the case where copper foil is used as the metal, the copper foil subjected to the electrolytic treatment is called electrolytic copper foil.

The plan shape and dimensions (length, width and thickness) of the current collector 1A can be freely selected depending on conditions such as the kind or application of the electrode 1. In FIGS. 1A and 1B, for example, the case where the plan shape of the current collector 1A is rectangular is shown. However, the thickness of the current collector 1A is preferably as thin as possible. It is because in the case where the volume of the whole electrode 1 is fixed, the ratio of the active material layer 1B in the volume is increased.

The active material layer 1B includes one kind or two or more kinds of active materials contributing electrode reaction. The kind of the active material can be freely selected depending on conditions such as the kind or application of the electrode 1. As an example, in the case where the electrode structure is used in a battery, a metal material or an alloy material is preferable as the active material. The active material layer 1B may be arranged on both sides of the current collector 1A as shown in FIGS. 1A and 1B or on only one side of the current collector 1A.

For example, the active material layer 1B is arranged so that the both entire surfaces of the current collector 1A are covered with the active material layer 1B, and is formed by a method capable of forming the active material layer 1B on the whole surface such as a vapor-phase method, a liquid-phase method, a spray method or a combination of two or more kinds selected from them. However, when the electrode lead 2 is arranged on the active material layer 1B, the active material layer 1B may be formed by a method capable of pattern-forming such as a coating method.

The thickness, the volume density or the like of the active material layer 1B can be freely selected depending on conditions such as the kind or application of the electrode 1. However, the thickness of the active material layer 1B is preferably as thick as possible. It is because the amount of the active material contributing electrode reaction is increased, so the performance of the electrode 1 is improved. Moreover, to improve the performance of the electrode 1, the volume density is preferably as high as possible.

The electrode lead 2 is made of, for example, the same metal material as that of the current collector 1A, and is made of metal foil.

The plan shape, dimensions (length, width and thickness) or the like of the electrode lead 2 can be freely selected depending on conditions such as the kind or application of the electrode 1. In FIGS. 1A and 1B, for example, the case where the plan shape of the electrode lead 2 is rectangular is shown. However, at least a part of the electrode lead 2 is preferably drawn to outside of the electrode 1. It is because the electrode 1 is easily electrically connected to outside through the electrode lead 2.

In the electrode structure, the electrode 1 and the electrode lead 2 are fixed by caulking. More specifically, a hole H is formed so as to penetrate the electrode 1 and the electrode lead 2, and the electrode 1 and the electrode lead 2 are folded back around the hole H in a direction away from the hole H so that the electrode 1 is placed inside. In other words, the electrode 1 and the electrode lead 2 have folded-back portions 1T and 2T folded back around the hole H, respectively. In this case, a tip (a position P2) of the folded-back portion 2T of the electrode lead 2 is positioned closer to the hole H than a tip (a position P1) of the folded-back portion 1T of the electrode 1.

The shape of the hole H, the number of the holes H (the caulking point number) or the numbers of the folded-back portions 1T and 2T can be freely selected depending on conditions such as the kind or application of the electrode structure. In FIGS. 1A and 1B, for example, the case where the shape of the hole H is rectangular, and the caulking point number is one, and the numbers of the folded-back portions 1T and 2T are four is shown.

Figure 2A:
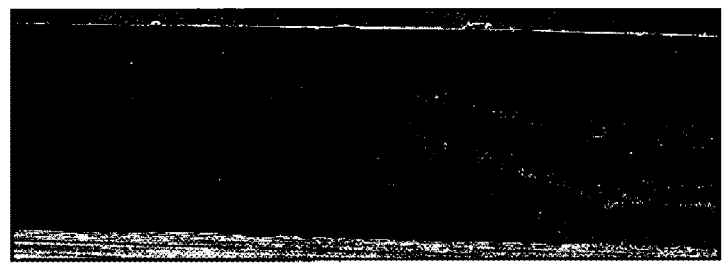
FIGS. 2A and 2B are an SEM photo and a schematic view of a main part of the electrode structure shown in FIGS. 1A and 1B.
Figure 2B:
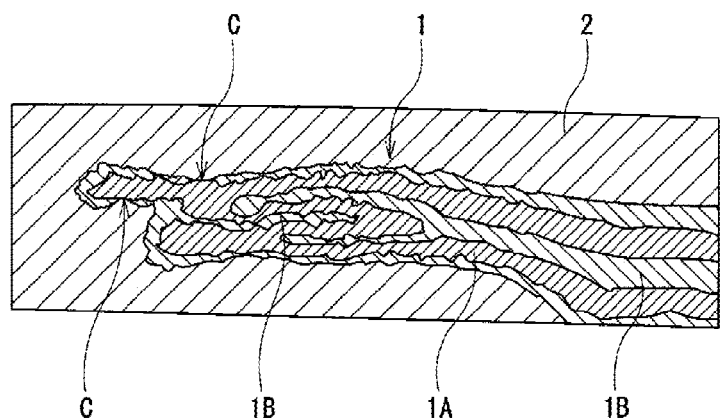

FIGS. 2A and 2B are illustrations for describing the configuration of a main part (a caulked part R) of the electrode structure shown in FIG. 1B, and FIG. 2A shows a scanning electron microscope (SEM) photo, and FIG. 2B schematically shows the SEM photo shown in FIG. 2A.

In the electrode 1, while the thickness of the active material layer 1B in a region where the electrode lead 2 is not arranged (a region where the electrode 1 and the electrode lead 2 are not caulked) is uniform, the thickness of the active material layer 1B in a region where the electrode lead 2 is arranged (a region where the electrode 1 and the electrode lead 2 are caulked) is nonuniform. In this case, "uniform" means a state in which in the case where the thickness when the active material layer 1B is formed on the current collector 1A (the thickness of the active material layer 1B before caulking the electrode 1 and the electrode lead 2) is a reference, the thickness is virtually maintained in a region. On the other hand, "nonuniform" means a state in which the above-described thickness of the active material layer 1B is not maintained in a region, and the state includes a state in which the thickness of the active material layer 1B is locally reduced, or the active material layer 1B is intermittently arranged.

In a region where the electrode lead 2 is arranged, for example, the electrode 1 is buckled to be folded multiply (for example, doubly). In this case, a part of the active material layer 1B is extended, and the thickness is locally reduced, so the electrode lead 2 comes closer to the current collector 1A. Moreover, a part of the active material layer 1B is dropped from the current collector 1A, and the active material layer 1B is intermittently arranged, so the current collector 1A is partially exposed from the active material layer 1B so as to make contact with the electrode lead 2. In other words, the current collector 1A and the electrode lead 2 are electrically conducted at a point where the active material layer 1B is not arranged as a contact point C.

The electrode structure can be manufactured by the following steps, for example. FIGS. 3 to 8 shows illustrations for describing steps of manufacturing the electrode structure, and shows sectional views corresponding to FIG. 1B.

Figure 3:
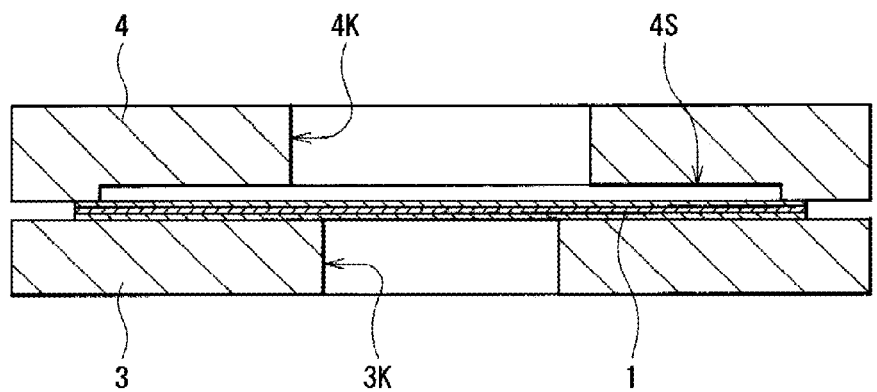
FIG. 3 is a sectional view for describing a step in steps of manufacturing the electrode structure according to the first embodiment of the invention.

When the electrode structure is manufactured, after the electrode 1 and the electrode lead 2 are prepared, at first, as shown in FIG. 3, the electrode 1 is fixed through the use of a lower retaining plate 3 and an upper retaining plate 4. The lower retaining plate 3 has an opening 3K near its center. Moreover, the upper retaining plate 4 has an opening 4K communicated with the opening 3K, and has a slit 4S on a surface facing the lower retaining plate 3. When the electrode 1 is fixed, after the electrode 1 is mounted on the lower retaining plate 3, the upper retaining plate 4 is mounted on the electrode 1 so that the electrode 1 is sandwiched between them.

Figure 4:
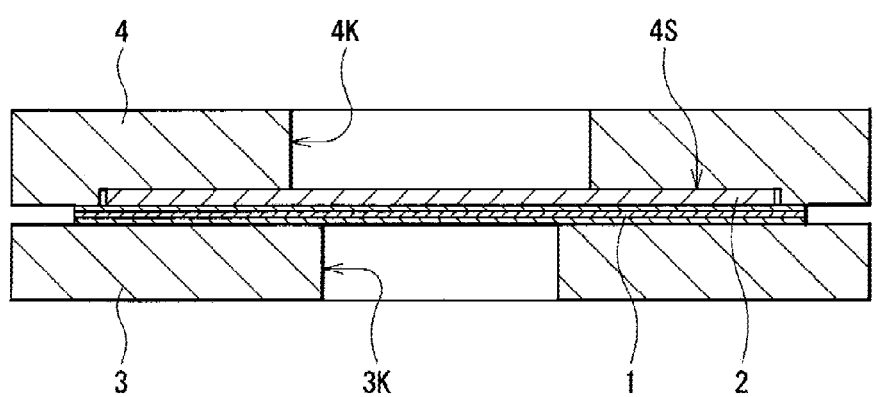
FIG. 4 is a sectional view for describing a step following the step of FIG. 3.

Next, as shown in FIG. 4, the electrode lead 2 is inserted into the slit 4S of the upper retaining plate 4 to be placed on the electrode 1.

Figure 5:
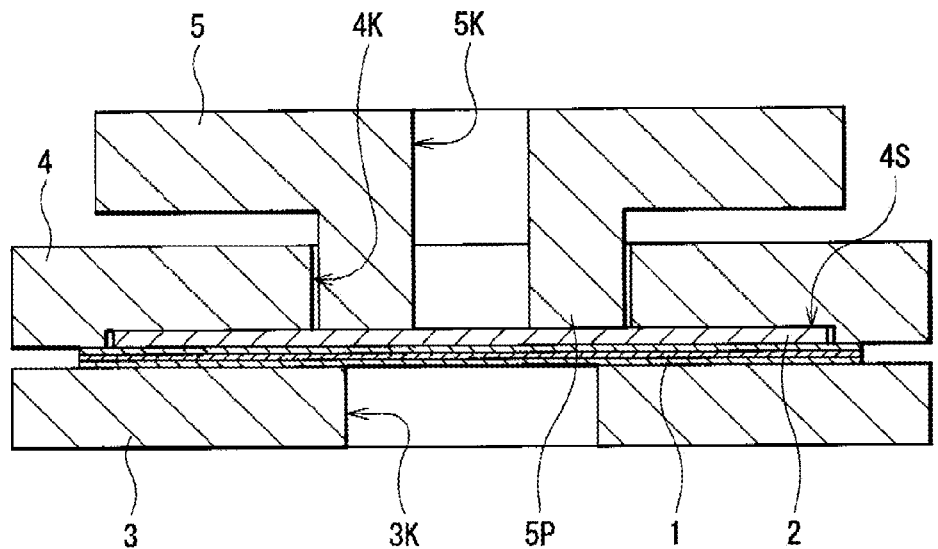
FIG. 5 is a sectional view for describing a step following the step of FIG. 4.

Then, as shown in FIG. 5, the electrode lead 2 is fixed through the use of a lead retainer 5. The lead retainer 5 has a tip portion 5P with a smaller outer diameter than the internal diameter of the opening 4K, and has an opening 5K communicated with the openings 3K and 4K. When the electrode lead 2 is fixed, the tip portion 5P of the lead retainer 5 is inserted into the opening 4K to make contact with the electrode lead 2, thereby the electrode lead 2 is sandwiched between the lower retaining plate 3 and the lead retainer 5 with the electrode 1 in between.

Figure 6:
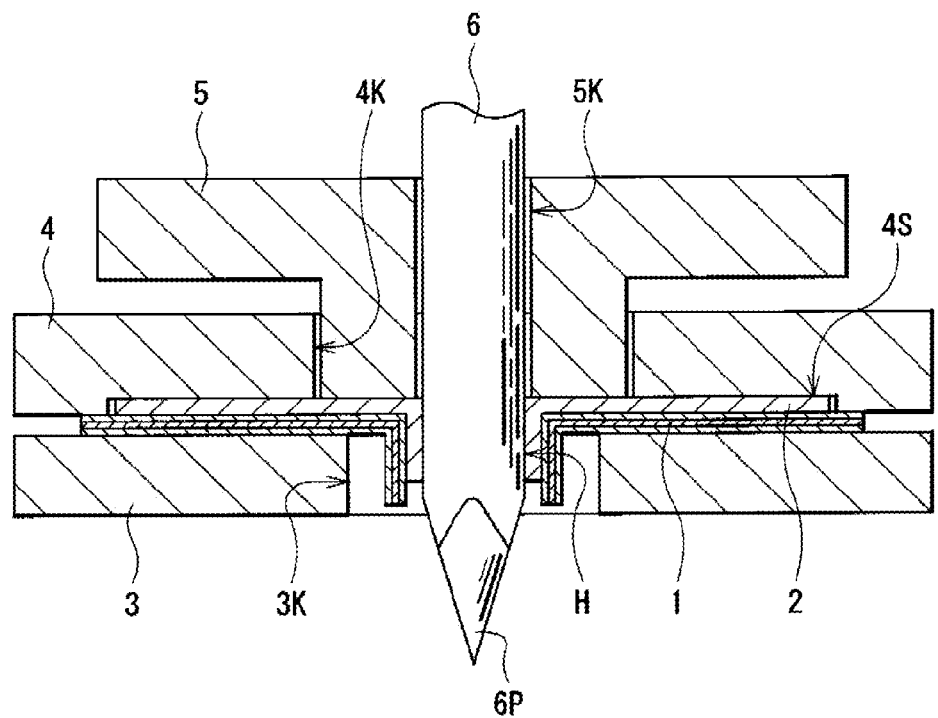
FIG. 6 is a sectional view for describing a step following the step of FIG. 5.

Next, as shown in FIG. 6, the hole H is formed by sticking a punching needle 6 as a punching tool into the electrode lead 2 and the electrode 1 in this order through the openings 3K to 5K to penetrate the electrode lead 2 and the electrode 1. The punching needle 6 has a polygonal pyramid (for example, square pyramid)-shaped tip portion 6P. When the hole H is formed, the tip portion 6P passes through the electrode 1 and the electrode lead 2, and the punching needle 6 punches through to a side opposite to a side where the punching needle 6 is punched. Thereby, the electrode 1 and the electrode lead 2 are folded around the hole H in a penetrating direction so that the electrode 1 is placed inside. In this case, as the electrode 1 is folded so as to be placed inside, a tip of a folded portion of the electrode 1 is projected in a penetrating direction more than a tip of a folded portion of the electrode lead 2.

Figure 7:
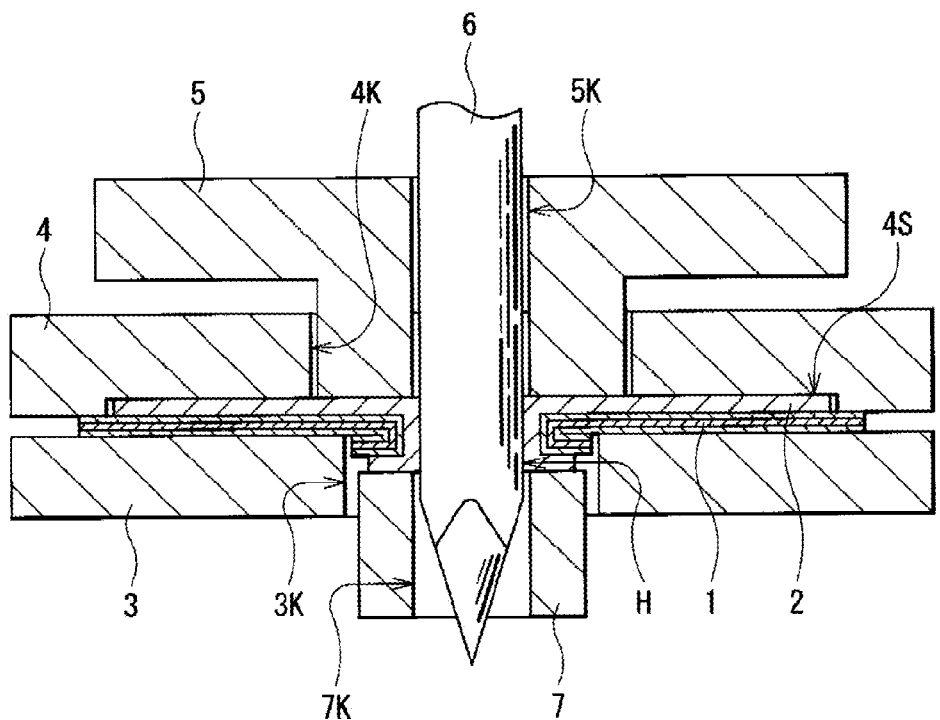
FIG. 7 is a sectional view for describing a step following the step of FIG. 6.

Next, as shown in FIG. 7, with the punching needle 6 passing through the hole H, the folded portions of the electrode 1 and the electrode lead 2 are folded back through the use of a caulking punch 7 in a direction away from the hole H. The caulking punch 7 has a smaller outer diameter than the internal diameter of the opening 3K, and has an opening 7K communicated with the openings 3K to 5K. When the electrode 1 and the electrode lead 2 are folded back, the caulking punch 7 is inserted into the opening 3K so that the punching needle 6 is inserted into the opening 7K, thereby, the caulking punch 7 makes contact with the electrode 1 and the electrode lead 2 to apply a press (a first press) to the folded portions. The press pressure of the first press can be freely selected.

Figure 8:
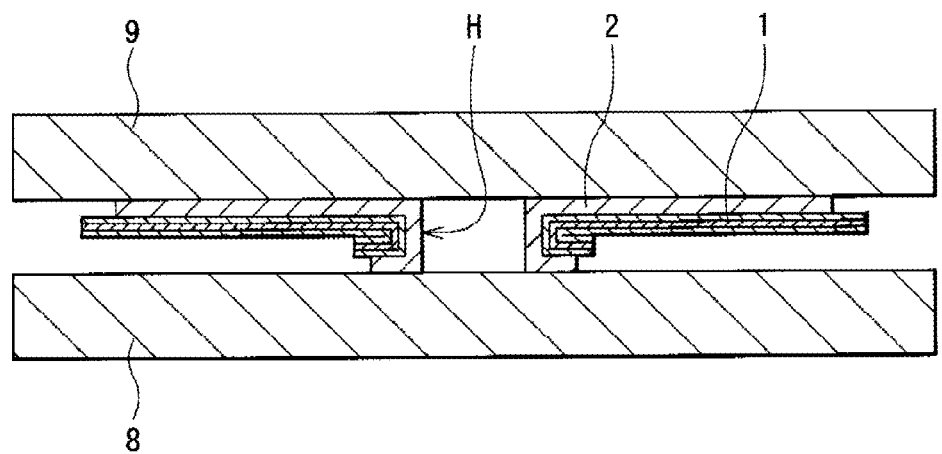
FIG. 8 is a sectional view for describing a step following the step of FIG. 7.

Finally, after the punching needle 6 is pulled out of the hole H, and the electrode 1 and the electrode lead 2 are taken out, as shown in FIG. 8, a press (a second press) is applied to the electrode 1 and the electrode lead 2 through the use of a lower pressing plate 8 and an upper pressing plate 9. The press pressure of the second press can be freely selected. When the press is applied to the electrode 1 and the electrode lead 2, the electrode 1 and the electrode lead 2 are sandwiched between the lower pressing plate 8 and the upper pressing plate 9, and then a press is applied to the electrode 1 and the electrode lead 2. Thereby, the electrode 1 and the electrode lead 2 are fixed by caulking, so the electrode structure shown in FIGS. 1A, 1B, 2A and 2B is completed. In this case, a strain caused by folding back the electrode 1 and the electrode lead 2 is corrected, so the folded portions are flattened and thinner, and the electrode lead 2 is stably bonded to the electrode 1.

According to the electrode structure and the method of manufacturing the electrode structure, the hole H is formed by penetrating the electrode lead 2 and the electrode 1 in this order by the punching needle 6, and the electrode lead 2 and the electrode 1 are folded around the hole H in the penetrating direction so that the electrode 1 is placed inside, and then they are folded back in a direction away from the hole H with the punching needle 6 passing through the hole H. Thereby, while the thickness of the active material layer 1B in a region where the electrode lead 2 is not arranged is uniform, the thickness of the active material layer 1B in a region where the electrode lead 2 is arranged is nonuniform. Therefore, because of the following reasons, variations in electrical performance can be prevented to stabilize performance and improve yields.

Figure 9:
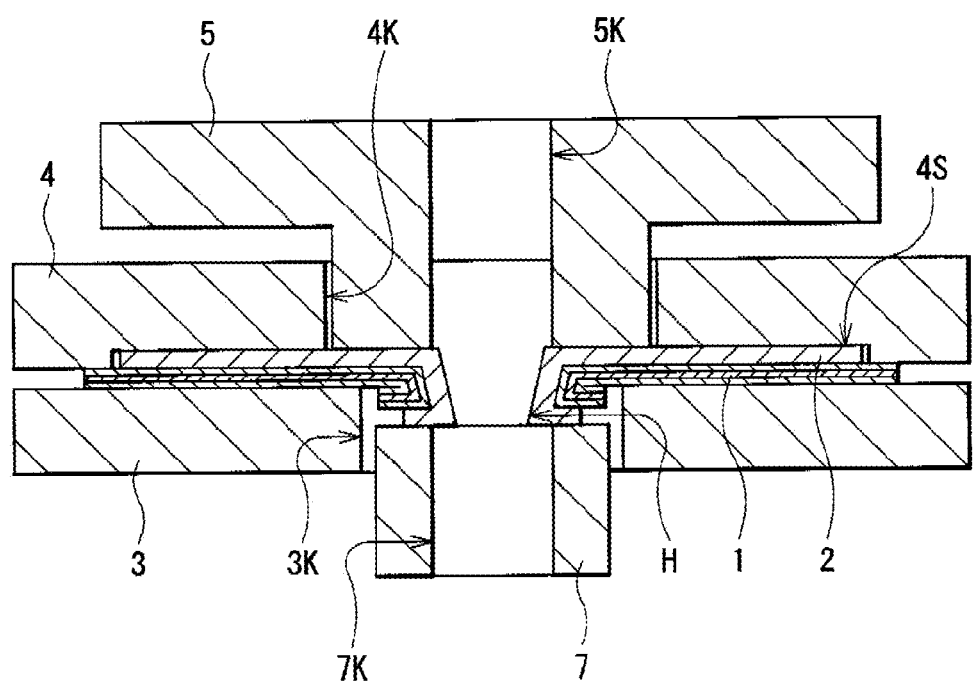
FIG. 9 is a sectional view for describing a step of manufacturing an electrode structure of a comparative example relative to the electrode structure according to the first embodiment of the invention.
Figure 10A:
FIGS. 10A and 10B are an SEM photo and a schematic view of a main part of the electrode structure of the comparative example.
Figure 10B:
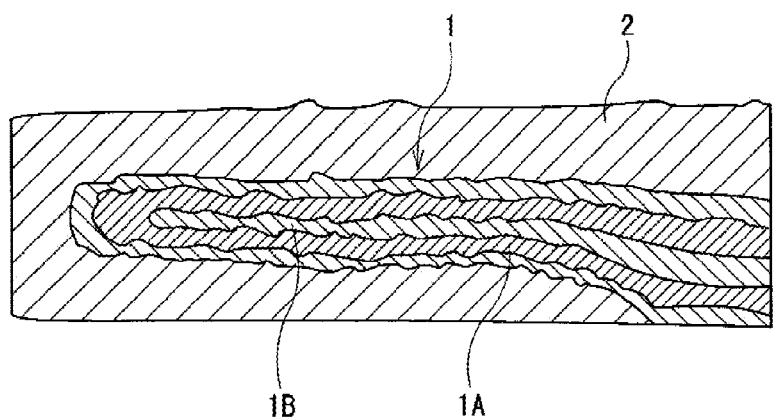

FIG. 9 shows an illustration for describing a step of manufacturing an electrode structure of a comparative example, and is a sectional view corresponding to FIG. 7. Moreover, FIGS. 10A and 10B show illustrations for describing the configuration and disadvantages of the electrode structure of the comparative example, and shows an SEM photo and a schematic view corresponding to FIGS. 2A and 2B. The electrode structure of the comparative example is manufactured by the same steps as those in the method of manufacturing the electrode structure according to the embodiment, except that after the punching needle 6 is pulled out of the hole H, the electrode 1 and the electrode lead 2 are folded back by the caulking punch 7.

In the comparative example, as shown in FIG. 9, in a state in which the pouncing needle 6 is not placed in the hole H, the caulking punch 7 presses the electrode 1 and the electrode lead 2, so the press pressure does not reach the electrode 1 and the electrode lead 2 sufficiently, and the electrode 1 and the electrode lead 2 are folded back while escaping to the hole H. In this case, as shown in FIGS. 10A and 10B, in a region where the electrode lead 2 is arranged, the thickness of the active material layer 1B is kept uniform as in the case of the thickness in a region where the electrode lead 2 is not arranged, so the current collector 1A and the electrode lead 2 are separated by the active material layer 1B, and the electrode lead 2 is kept away from the current collector 1A. In other words, the electrode 1 and the electrode lead 2 are not sufficiently caulked, so it is difficult to obtain sufficient electrical conduction between them. Thereby, electrical performance such as electrical conductivity easily varies, so it is difficult to stabilize the performance and improve yields.

On the other hand, in the embodiment, as shown in FIG. 7, in a state in which the punching needle 6 is placed in the hole H, the caulking punch 7 presses the electrode 1 and the electrode lead 2, and the punching needle 6 functions as a barrier preventing the electrode 1 and the electrode lead 2 from escaping, so the press pressure sufficiently reaches the electrode 1 and the electrode lead 2, and they are folded back without escaping to the hole H. In this case, as shown in FIGS. 2A and 2B, in a region where the electrode lead 2 is arranged, the electrode 1 is buckled to be multiply folded, so the thickness of the active material layer 1B is nonuniform. Thereby, the thickness of the active material layer 1B is locally reduced at a point where the electrode 1 extends, so the electrode lead 2 comes closer to the current collector 1A at the point. Moreover, the active material layer 1B is intermittently arranged, so the electrode lead 2 makes contact with the current collector 1A at the point where the active material layer 1B is not arranged as the contact point C. In other words, the electrode 1 and the electrode lead 2 are sufficiently caulked, so sufficient electrical conduction between them can be obtained. Therefore, the electrode structure is resistant to variations in electrical performance such as electrical conductivity, so the performance can be stabilized, and yields can be improved.

In particular, in the case where a caulking method is used, the same electrical conductivity as in the case where after a part of the active material layer 1B is removed, the electrode lead 2 is directly bonded to an exposed surface of the current collector 1A by a welding method or the like can be obtained, so good electrical conductivity can be obtained by a caulking method of which the operation is simple.

In this case, to improve electrical performance while the volume of the whole electrode 1 is maintained, when the thickness of the active material layer 1B is increased while reducing the thickness of the current collector 1A, electrical conductivity between the current collector 1A and the electrode lead 2 with the active material layer 1B in between easily declines, so a higher effect can be obtained. Moreover, when the active material layer 1B is not formed by a method capable of pattern-forming such as a coating method, and is formed by a method capable of forming the active material layer 1B on the whole surface such as a vapor-phase method, the current collector 1A and the electrode lead 2 are forced to be caulked with the active material layer 1B in between, so a higher effect can be obtained.

Second Embodiment

Figure 11:
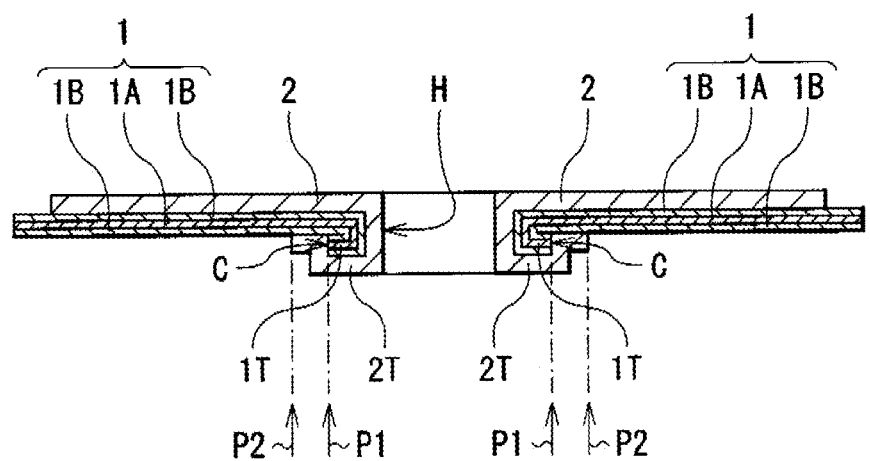
FIG. 11 is a sectional view showing the configuration of an electrode structure according to a second embodiment of the invention.

FIG. 11 shows the configuration of an electrode structure according to a second embodiment of the invention, and shows a sectional view corresponding to FIG. 1B. In FIG. 11, like components are denoted by like numerals as of the first embodiment.

The electrode structure has the same configuration as that of the electrode structure according to the first embodiment, except that the electrode 1 and the electrode lead 2 are folded back around the hole H in a direction away from the hole H so that the electrode 1 is placed inside, and the folded-back portion 2T of the electrode lead 2 makes contact with the current collector 1A exposed at a tip of the folded-back portion 1T of the electrode 1. In other words, the current collector 1A and the electrode lead 2 are electrically conducted at an exposed point of the current collector 1A exposed at the tip of the folded-back portion 1T as the contact point C. In this case, the tip (the position P2) of the folded-back portion 2T of the electrode lead 2 is positioned farther from the hole H than the tip (the position P1) of the folded-back portion 1T of the electrode 1.

The electrode structure is manufactured by the following steps, for example. FIGS. 12 to 15 are illustrations for describing steps of manufacturing the electrode structure, and show sectional views corresponding to FIG. 11.

Figure 12:
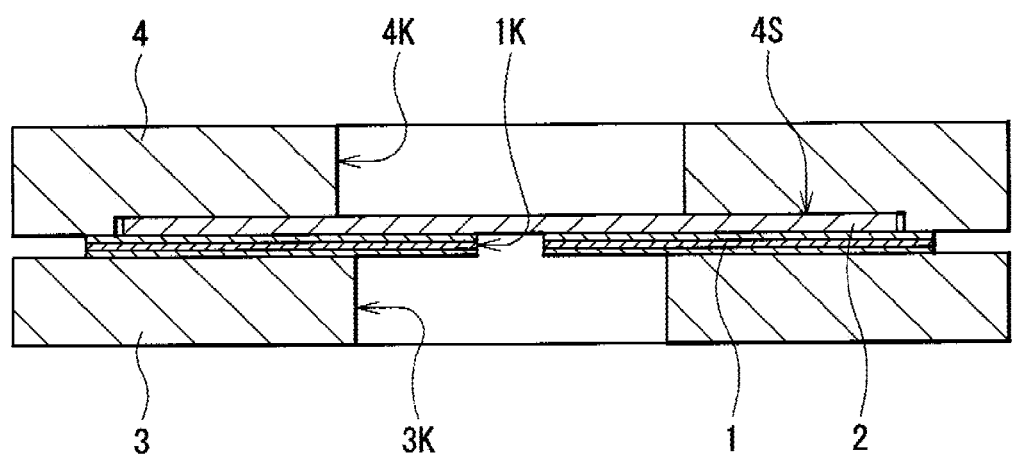
FIG. 12 is a sectional view for describing a step in steps of manufacturing the electrode structure according to the second embodiment of the invention.

When the electrode structure is manufactured, after the electrode 1 having the opening 1K near its center is prepared, at first, as shown in FIG. 12, the electrode 1 is fixed through the use of the lower retaining plate 3 and the upper retaining plate 4 by the steps described referring to FIGS. 3 and 4, and the electrode lead 2 is inserted into the slit 4S to be placed on the electrode 1. When the electrode 1 is fixed, the position of the electrode 1 is adjusted so that the opening 1K is communicated with the openings 3K and 4K.

Figure 13:
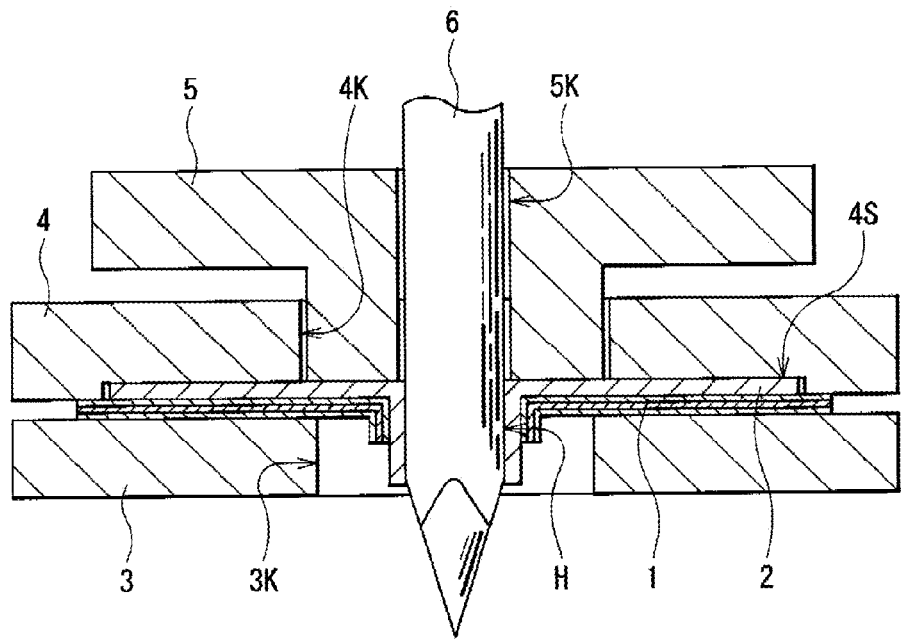
FIG. 13 is a sectional view for describing a step following the step of FIG. 12.

Next, as shown in FIG. 13, after the electrode lead 2 is fixed through the use of the lead retainer 5 by the steps described referring to FIGS. 5 and 6, the hole H is formed by penetrating the electrode lead 2 and the electrode 1 in this order by the punching needle 6 so that the punching needle 6 passes through the opening 1K via the openings 3K to 5K, thereby the electrode 1 and the electrode lead 2 are folded around the hole H in the penetrating direction so that the electrode 1 is placed inside. In this case, as the electrode 1 having the opening 1K in advance is folded so as to be placed inside, a tip of a folded portion of the electrode lead 2 is projected in the penetrating direction more than a tip of a folded portion of the electrode 1. The internal diameter of the opening 1K can be freely selected.

Figure 14:
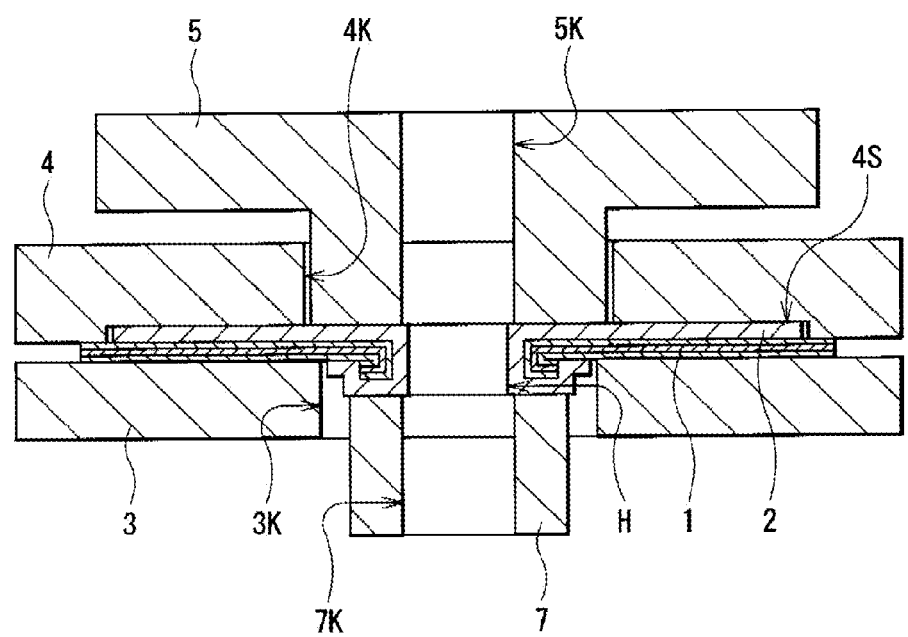
FIG. 14 is a sectional view for describing a step following the step of FIG. 13.

Next, as shown in FIG. 14, the folded portions of the electrode 1 and the electrode 2 are folded back in a direction away from the hole H through the use of the caulking punch 7 by the step described referring to FIG. 7 (the first press). In this case, they may be folded back with the punching needle 6 passing through the hole H, or they may be folded back after the punching needle 6 is pulled out of the hole H.

Figure 15:
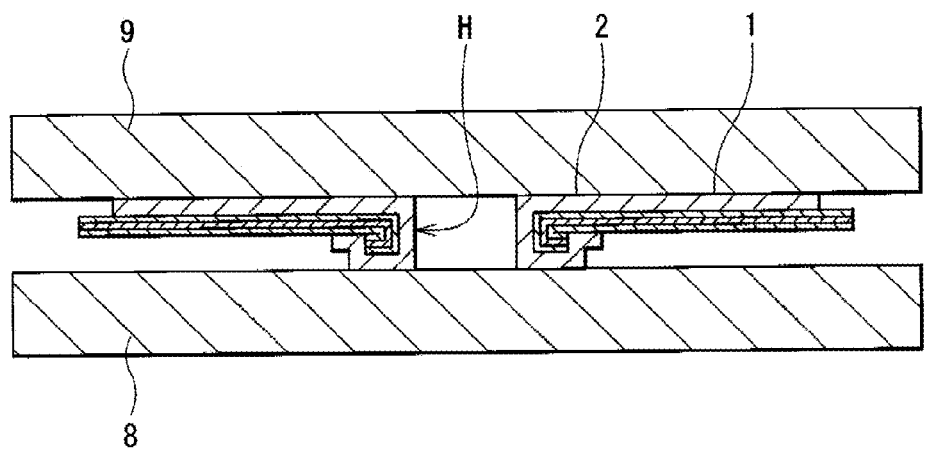
FIG. 15 is a sectional view for describing a step following the step of FIG. 14.

Finally, as shown in FIG. 15, the electrode 1 and the electrode lead 2 are pressed through the use of the lower pressing plate 8 and the upper pressing plate 9 by the step described referring to FIG. 8 (the second press). Thereby, the electrode 1 and the electrode lead 2 are fixed by caulking, so the electrode structure shown in FIG. 11 is completed.

According to the electrode structure and the method of manufacturing the electrode structure, the hole H is formed by penetrating the electrode lead 2 and the electrode 1 having the opening 1K in this order by the punching needle 6 so that the punching needle 6 passes through the opening 1K, and after the electrode lead 2 and the electrode 1 are folded around the hole H in the penetrating direction so that the electrode 1 is placed inside, they are folded back in a direction away from the hole H. Thereby, the folded-back portion 2T of the electrode lead 2 makes contact with the current collector 1A exposed at the tip of the folded-back portion 1T of the electrode 1. Therefore, the electrode 1 and the electrode lead 2 are sufficiently caulked, and sufficient electrical conduction between them can be obtained, so as in the case of the first embodiment, variations in electrical performance can be prevented to stabilize the performance and improve yields.

In particular, in the case where the electrode 1 and the electrode lead 2 are folded back through the use of the caulking punch 7, when they are folded back with the punching needle 6 passing through the hole H, by the same function as that in the first embodiment, the electrode 1 and the electrode lead 2 are folded back without escaping to the hole H, so a higher effect can be obtained.

Third Embodiment

Figure 16:
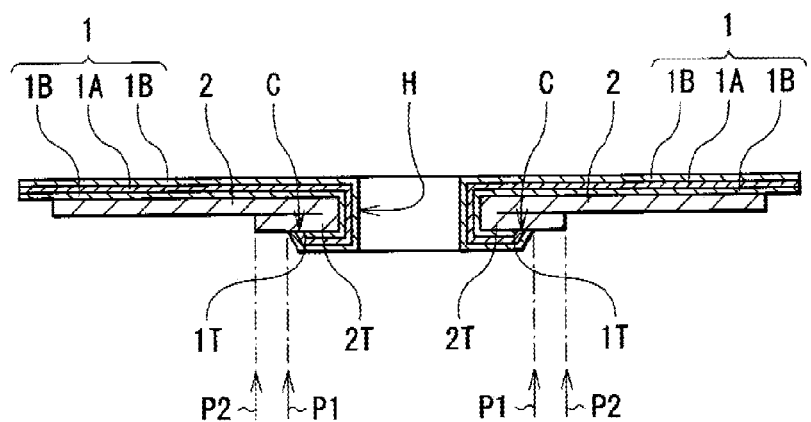
FIG. 16 is a sectional view showing the configuration of an electrode structure according to a third embodiment of the invention.

FIG. 16 shows the configuration of an electrode structure according to a third embodiment of the invention, and shows a sectional view corresponding to FIG. 1B. In FIG. 16, like components are denoted by like numerals as of the first embodiment.

The electrode structure has the same configuration as that of the electrode structure according to the first embodiment, except that the electrode 1 and the electrode lead 2 are folded back around the hole H in a direction away from the hole H so that the electrode lead 2 is placed inside, and the folded-back portion 2T of the electrode lead 2 makes contact with the current collector 1A exposed at the tip of the folded-back portion 1T of the electrode 1. In other words, the current collector 1A and the electrode lead 2 are electrically conducted at an exposed point of the current collector 1A exposed at the tip of the folded-back portion 1T as the contact point C. In this case, the tip (the position P2) of the folded-back portion 2T of the electrode lead 2 is positioned farther from the hole H than the tip (the position P1) of the folded-back portion 1T of the electrode 1.

The electrode structure is manufactured by the following steps, for example. FIGS. 17 to 20 are illustrations for describing steps of manufacturing the electrode structure, and show sectional views corresponding to FIG. 16.

Figure 17:
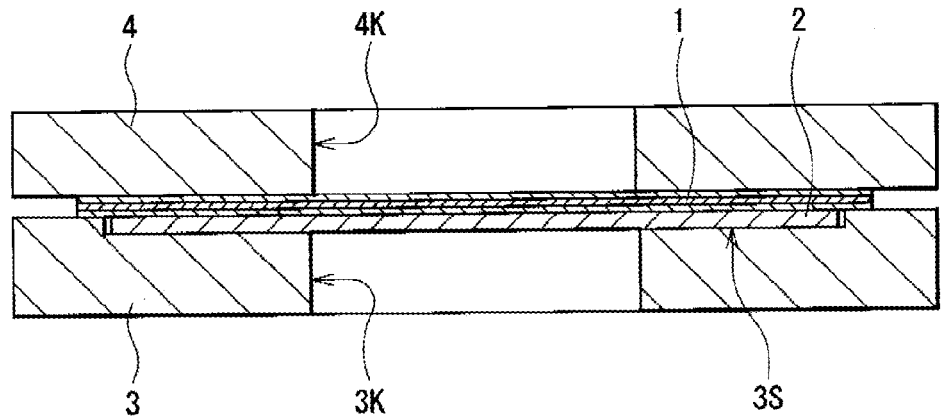
FIG. 17 is a sectional view for describing a step in steps of manufacturing the electrode structure according to the third embodiment of the invention.

When the electrode structure is manufactured, at first, as shown in FIG. 17, the electrode 1 is fixed through the use of the lower retaining plate 3 and the upper retaining plate 4. In this case, instead of the upper retaining plate 4, the lower retaining plate 3 has a slit 3S on a surface facing the upper retaining plate 4. When the electrode 1 is fixed, after the electrode 1 is mounted on the lower retaining plate 3, the upper retaining plate 4 is mounted on the electrode 1 so that the electrode 1 is sandwiched between the lower retaining plate 3 and the upper retaining plate 4. After that, the electrode lead 2 is inserted into the slit 3S of the lower retaining plate 3 so as to be placed on the electrode 1.

Figure 18:
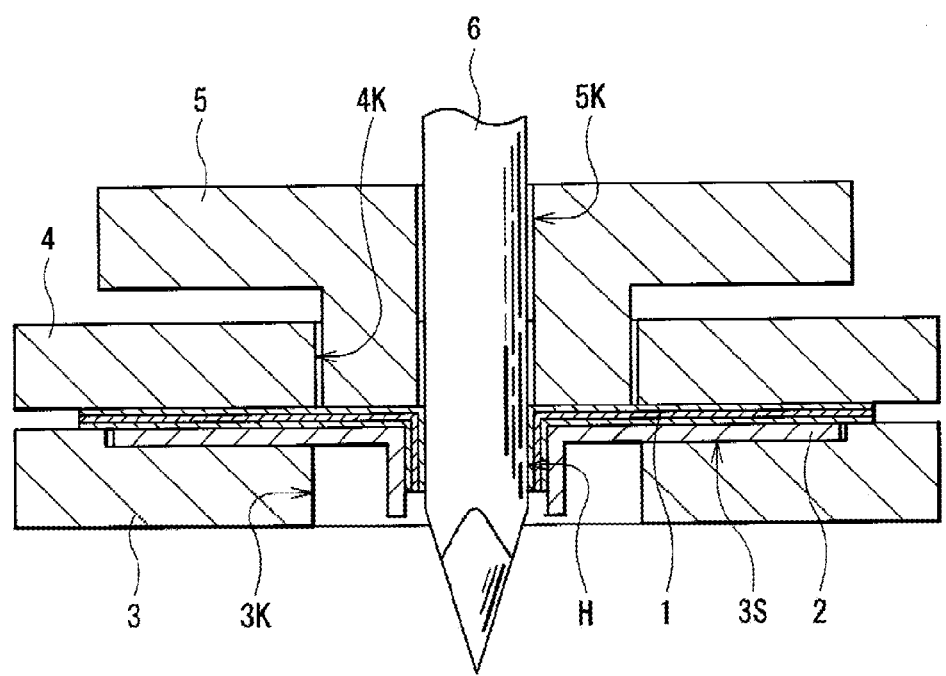
FIG. 18 is a sectional view for describing a step following the step of FIG. 17.

Next, as shown in FIG. 18, after the electrode lead 2 is fixed through the use of the lead retainer 5 by the steps described referring to FIGS. 5 and 6, the hole H is formed by penetrating the electrode 1 and the electrode lead 2 in this order by the punching needle 6 via the openings 3K to 5K, thereby the electrode 1 and the electrode lead 2 are folded around the hole H in the penetrating direction so that the electrode lead 2 is placed inside. In this case, as they are folded so that the electrode lead 2 is placed inside, a tip of a folded portion of the electrode lead 2 is projected in the penetrating direction more than a tip of a folded portion of the electrode 1.

Figure 19:
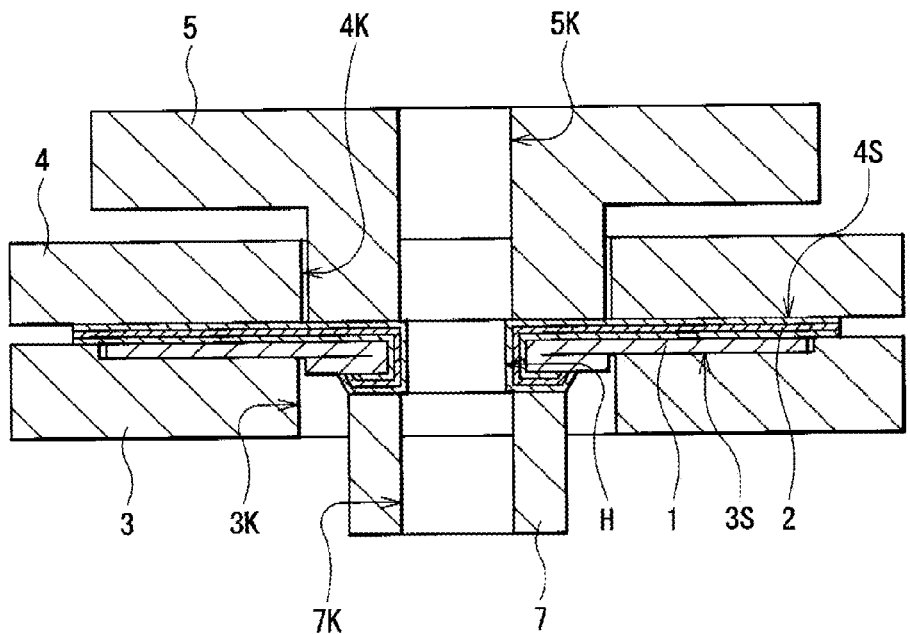
FIG. 19 is a sectional view for describing a step following the step of FIG. 18.

Next, as shown in FIG. 19, the folded portions of the electrode 1 and the electrode lead 2 are folded back in a direction away from the hole H through the use of the caulking punch 7 (the first press). In this case, they may be folded back with the punching needle 6 passing through the hole H, or they may be folded back after the punching needle 6 is pulled out of the hole H.

Figure 20:
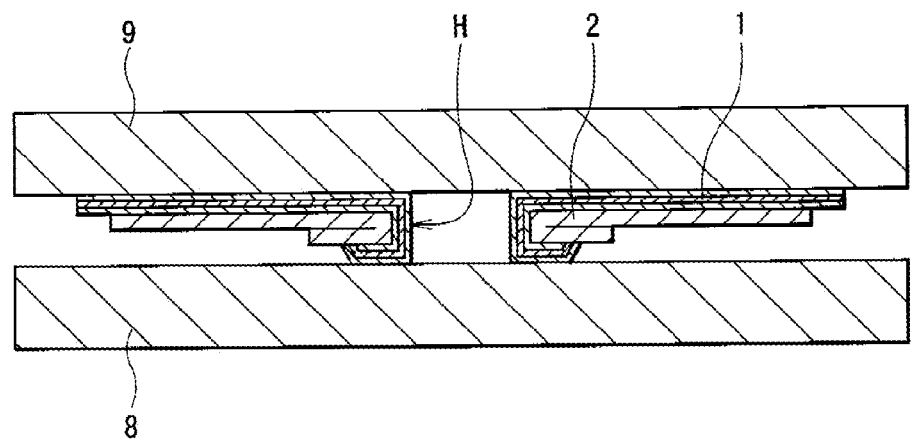
FIG. 20 is a sectional view for describing a step following the step of FIG. 19.

Finally, as shown in FIG. 20, the electrode 1 and the electrode lead 2 are pressed through the use of the lower pressing plate 8 and the upper pressing plate 9 by the step described referring to FIG. 8 (the second press). Thereby, the electrode 1 and the electrode lead 2 are fixed by caulking, so the electrode structure shown in FIG. 16 is completed.

According to the electrode structure and the method of manufacturing the electrode structure, the hole H is formed by penetrating the electrode 1 and the electrode lead 2 in this order by the punching needle 6, and after the electrode 1 and the electrode lead 2 are folded around the hole H in the penetrating direction so that the electrode lead 2 is placed inside, they are folded back in a direction away from the hole H. Thereby, the folded-back portion 2T of the electrode lead 2 makes contact with the current collector 1A exposed at the tip of the folded-back portion 1T of the electrode 1. Therefore, the electrode 1 and the electrode lead 2 are sufficiently caulked, and sufficient electrical conduction between them can be obtained, so as in the case of the first embodiment, variations in electrical performance can be prevented to stabilize performance and improve yields.

In particular, when the electrode 1 and the electrode lead 2 are folded back with the punching needle 6 passing through the hole H, by the same function as that in the second embodiment, a higher effect can be obtained.

Next, the application of the electrode structures according to a series of the above-described embodiments will be described below. In this case, a battery is cited as an example of an electrochemical device, and the electrode structure is used in the battery as below.

Figure 21:
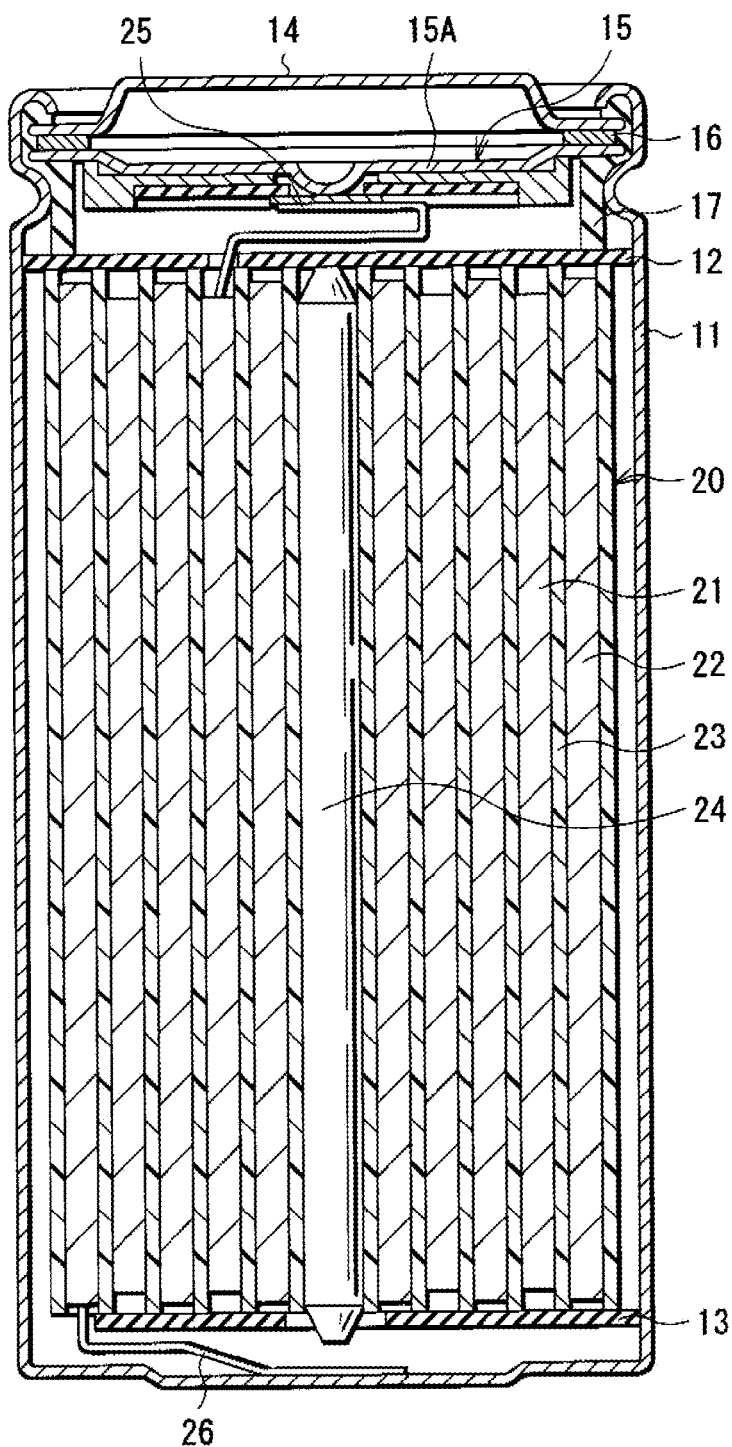
FIG. 21 is a sectional view showing the configuration of a battery using an electrode structure of the invention.
Figure 22:
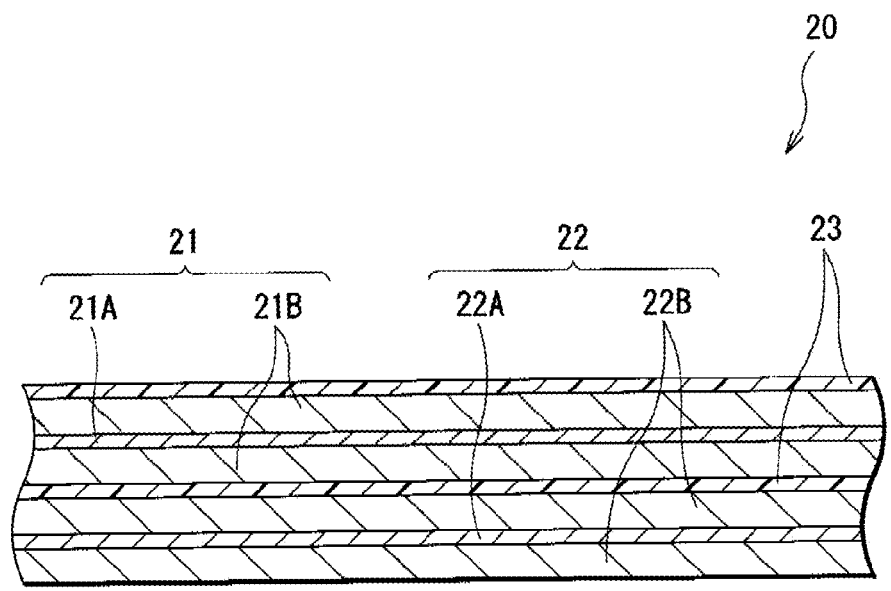
FIG. 22 is an enlarged sectional view showing a main part of the battery shown in FIG. 21.

FIGS. 21 and 22 show the configuration of the battery, and FIG. 21 shows a sectional view, and the FIG. 22 shows an enlarged sectional view of a main part shown in FIG. 21. The battery described here is, for example, a lithium-ion secondary battery in which the capacity of an anode is represented by a capacity component by insertion and extraction of lithium as an electrode reactant.

As shown in FIG. 21, the secondary battery includes a spirally wound electrode body 20 which includes a cathode 21 and an anode 22 spirally wound with a separator 23 in between and a pair of insulating plates 12 and 13 in a substantially hollow cylindrical-shaped battery can 11, and has a so-called cylindrical type configuration. The battery can 11 is made of, for example, nickel (Ni)-plated iron (Fe). An end portion of the battery can 11 is closed, and the other end portion thereof is opened. The pair of insulating plates 12 and 13 are disposed so that the spirally wound electrode body 20 is sandwiched therebetween in a direction perpendicular to a peripheral winding surface. A center pin 24 is inserted into the center of the spirally wound electrode body 20.

In the opened end portion of the battery can 11, a battery cover 14, and a safety valve mechanism 15 and a positive temperature coefficient device (PTC device) 16 disposed inside the battery cover 14 are mounted by caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16. When an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation by a large current. The gasket 17 is made of, for example, an insulating material, and its surface is coated with asphalt.

A combination of the cathode 21 and the cathode lead 25 has the same configuration as that of the above-described electrode structure. In this case, the configuration of the electrode structure may be any of the configurations according to the first, second and third embodiments. More specifically, for example, as shown in FIG. 22, the cathode 21 is formed by arranging a cathode active material layer 21B on both sides of a cathode current collector 21A having a pair of facing surfaces. The cathode current collector 21A is made of, for example, a metal material such as aluminum, nickel or stainless, and the cathode current collector 21A is preferably made of aluminum among them. It is because high corrosion resistance can be obtained. The cathode active material layer 21B includes one kind or two or more kinds of cathode materials capable of inserting and extracting lithium as an electrode reactant as cathode active materials, and the cathode active material layer 21B may include any other material such as an electrical conductor, if necessary. The cathode lead 25 is made of, for example, a metal material such as aluminum, and is welded to the safety valve mechanism 15 so as to be electrically connected to the battery cover 14.

As the cathode material capable of inserting and extracting lithium, for example, lithium cobalt oxide, lithium nickel oxide, a solid solution including lithium cobalt oxide and lithium nickel oxide ($Li(Ni_xCo_yMn_z)O_2$: the values of x, y and z are $0<x<1$, $0<y<1$ and $0<z<1$, and $x+y+z=1$), lithium complex oxide such as lithium manganese oxide ($LiMn_2O_4$) with a spinel structure or a solid solution thereof ($Li(Mn_{2-v}Ni_v)O_4$: the value of v is $v<2$), a phosphate compound with an olivine structure such as lithium iron phosphate ($LiFePO_4$), or the like is preferable, because a high energy density can be obtained. Moreover, examples of the above-described cathode material include oxides such as titanium oxide, vanadium oxide and manganese dioxide, bisulfides such as iron bisulfide, titanium bisulfide and molybdenum sulfide, sulfur, and conductive polymers such as polyaniline and polythiophene.

A combination of the anode 22 and the anode lead 26 has the same configuration as that of the above-described electrode structure. The configuration of the electrode structure in this case may be any of the configurations according to the first, second and third embodiments. More specifically, for example, as shown in FIG. 22, the anode 22 is formed by arranging the anode active material layer 22B on both sides of the anode current collector 22A having a pair of facing surfaces. The anode current collector 22A is made of, for example, a metal material such as copper, nickel or stainless, and the anode current collector 22A is preferably made of copper among them. It is because high electrical conductivity can be obtained. The anode active material layer 22B includes one kind or two or more kind of anode materials capable of inserting and extracting lithium as anode active materials, and the anode active material layer 22B may include any other material such as an electrical conductor, if necessary. The anode lead 26 is made of, for example, a metal material such as nickel, and is welded and electrically connected to the battery can 11.

As the anode material capable of inserting and extracting lithium, for example, a material which can insert and extract lithium and includes at least one kind selected from the group consisting of metal elements and metalloid elements as an element is cited. Such an anode material is preferable, because a high energy density can be obtained. The anode material may include the simple substance, an alloy or a compound of a metal element or a metalloid element, and a phase of one kind or two or more kinds selected from them may be included at least in a part of the anode material. In this case, the alloy includes an alloy including one or more kinds of metal elements and one or more kinds of metalloid elements in addition to an alloy including two or more kinds of metal elements. Further, the alloy may include a non-metal element. As the texture of the alloy, a solid solution, a eutectic (eutectic mixture), an intermetallic compound or the coexistence of two or more kinds selected from them is cited.

Examples of the metal elements or the metalloid elements included in the anode material include metal elements and metalloid elements capable of forming an alloy with lithium. More specifically, magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) or the like is included. Among them, at least one of silicon and tin is specifically preferable, because silicon and tin have a large capability to insert and extract lithium, so a high energy density can be obtained.

As the anode material including at least one kind selected from the group consisting of silicon and tin, for example, the simple substance, an alloy or a compound of silicon, the simple substance, an alloy or a compound of tin, or a material including a phase of one kind or two or more kinds selected from them at least in a part thereof is cited. One kind or a mixture of a plurality of kinds selected from them may be used.

As an alloy of silicon, for example, an alloy including at least one kind selected from the group consisting of tin, nickel, copper, iron, cobalt (Co), manganese (Mn), zinc, indium, silver, titanium (Ti), germanium, bismuth, antimony (Sb) and chromium (Cr) as a second element in addition to silicon is cited. As an alloy of tin, for example, an alloy including at least one kind selected from the group consisting of silicon, nickel, copper, iron, cobalt, manganese, zinc, indium, silver, titanium, germanium, bismuth, antimony and chromium as a second element in addition to tin is cited.

As a compound of silicon or a compound of tin, for example, a compound including oxygen or carbon is cited, and in addition to silicon or tin, the compound may include the above-described second element.

Among them, as the anode material including at least one kind selected from the group consisting of silicon and tin, for example, an anode material including tin as a first element, a second element and a third element is preferable. The second element is at least one kind selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth and silicon. The third element is at least one kind selected from the group consisting of boron, carbon, aluminum and phosphorus. It is because when the second element and the third element are included, cycle characteristics are improved.

Among them, as the anode material, a CoSnC-containing material in which tin, cobalt and carbon are included as elements, and the carbon content is within a range from 9.9 wt % to 29.7 wt % both inclusive, and the ratio of cobalt to the total of tin and cobalt (Co/(Sn+Co)) is within a range from 30 wt % to 70 wt % both inclusive is preferable, because a high energy density and superior cycle characteristics can be obtained in such a composition range.

The CoSnC-containing material may include any other element, if necessary. As the element, for example, silicon, iron, nickel, chromium, indium, niobium, germanium, titanium, molybdenum, aluminum, phosphorus, gallium, bismuth or the like is preferable, and two or more kinds selected from them may be included. It is because the capacity or the cycle characteristics can be further improved.

The CoSnC-containing material includes a phase including tin, cobalt and carbon, and the phase preferably has a low crystalline structure or an amorphous structure. Moreover, in the CoSnC-containing material, at least a part of carbon as an element is preferably bonded to a metal element or a metalloid element as another element. It is considered that a decline in the cycle characteristics is caused by cohesion or crystallization of tin or the like, and when carbon is bonded to another element, such cohesion or crystallization can be prevented.

As a measuring method for checking the bonding state of an element, for example, X-ray photoelectron spectroscopy (XPS) is used. In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated by analyzing the waveform through the use of, for example, commercially available software. In the analysis of the waveform, the position of a main peak existing on a lowest binding energy side is used as an energy reference (284.8 eV).

The anode active material layer 22B is formed by, for example, a vapor-phase method, a liquid-phase method, a spraying method or a firing method, or a combination of two or more methods selected from them, and the anode active material layer 22B and the anode current collector 22A are preferably alloyed in at least a part of an interface therebetween. More specifically, in the interface, an element of the anode current collector 22A is preferably diffused into the anode active material layer 22B, or an element of the anode active material layer 22B is preferably diffused into the anode current collector 22A, or they are preferably diffused into each other, because a fracture of the anode active material layer 22B due to swelling and shrinkage thereof according to charge and discharge can be prevented, and the electronic conductivity between the anode active material layer 22B and the anode current collector 22A can be improved.

As the vapor-phase method, for example, a physical deposition method or a chemical deposition method can be used, and more specifically, a vacuum deposition method, a sputtering method, an ion plating method, a laser ablation method, a thermal chemical vapor deposition (CVD) method, a plasma chemical vapor deposition method or the like can be used. As the liquid-phase method, a known technique such as electrolytic plating or electroless plating can be used. In a firing method, for example, a particulate anode active material is mixed with a binder or the like to form a mixture, and the mixture is dispersed in a solvent, and is applied, and then the mixture is heated at a higher temperature than the melting point of the binder or the like. As the firing method, a known technique such as, for example, an atmosphere firing method, a reaction firing method or a hot press firing method can be used.

In the secondary battery, for example, the amounts of the cathode active material and the anode material capable of inserting and extracting lithium are adjusted, thereby a charge capacity by the anode active material is larger than a charge capacity by the cathode active material, and even if the secondary battery is fully charged, lithium metal is not deposited on the anode 22.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, or a porous ceramic film, and the separator 23 may have a configuration in which two or more kinds of the porous films are laminated. Among them, the porous film made of polyolefin is preferable, because a short-circuit preventing effect is superior, and the safety of the battery by a shutdown effect can be improved. In particular, polyethylene is preferable, because a shutdown effect can be obtained within a range from 100° C. to 160° C. both inclusive, and electrochemical stability is superior. Moreover, polypropylene is preferable, and any other resin having chemical stability may be used by copolymerizing or blending with polyethylene or polypropylene.

The separator 23 is impregnated with an electrolytic solution as a liquid electrolyte. The electrolytic solution includes a solvent and an electrolyte salt dissolved in the solvent.

The solvent includes one kind or two or more kinds of nonaqueous solvents such as organic solvents. As the nonaqueous solvent, for example, a carbonate-based solvent such as ethylene carbonate, propylene carbonate, butylene carbonate, dimethyl carbonate, diethyl carbonate, ethyl methyl carbonate or methyl propyl carbonate is cited. It is because superior capacity characteristics, storage characteristics and cycle characteristics can be obtained. One kind or a mixture of a plurality of kinds selected from them may be used. Among them, as the solvent, a mixture of a high-viscosity solvent such as ethylene carbonate or propylene carbonate and a low-viscosity solvent such as dimethyl carbonate ethyl methyl carbonate or diethyl carbonate is preferable. It is because the dissociation property of the electrolyte salt and ion mobility are improved, so a higher effect can be obtained.

In particular, the solvent preferably includes a halogenated carbonate. It is because a stable coating is formed on a surface of the anode 22 so as to prevent the decomposition reaction of the electrolytic solution, so cycle characteristics are improved. As the halogenated carbonate, a fluorinated carbonate such as 4-fluoro-1,3-dioxolane-2-one or 4,5-difluoro-1,3-dioxolane-2-one is preferable, because a higher effect can be obtained.

Moreover, the solvent preferably includes a cyclic carbonate having an unsaturated bond, because cycle characteristics are improved. As the cyclic carbonate having an unsaturated bond, for example, vinylene carbonate, vinyl ethylene carbonate or the like is cited.

The electrolyte salt includes one kind or two or more kinds of light-metal salts such as a lithium salt. Examples of the lithium salt include lithium hexafluorophosphate ($LiPF_6$), lithium perchlorate ($LiClO_4$), lithium hexafluoroarsenate ($LiAsF_6$) and the like, because superior capacity characteristics, storage characteristics and cycle characteristics can be obtained. One kind or a mixture of a plurality of kinds selected from them may be used. Among them, as the electrolyte salt, lithium hexafluorophosphate is preferable, because internal resistance declines, so a higher effect can be obtained. The content of the electrolyte salt in the solvent is, for example, within a range from 0.3 mol/kg to 3.0 mol/kg both inclusive, because superior capacity characteristics can be obtained.

In the secondary battery, instead of the liquid electrolyte (the electrolytic solution), a solid or gel electrolyte may be used.

The solid electrolyte may be an inorganic solid electrolyte or a solid polymer electrolyte, as long as the solid electrolyte has ionic conductivity. As the inorganic solid electrolyte, for example, lithium nitride, lithium iodide or the like is cited. As the solid polymer electrolyte, for example, a solid polymer electrolyte including an electrolyte salt and a polymer compound holding the electrolyte salt is cited. As the polymer compound, for example, an ether-based polymer such as polyethylene oxide or a cross-link of polyethylene oxide, a polymethacrylate ester-based polymer or an acrylate-based polymer, or a copolymer thereof or a mixture thereof is cited.

The gel electrolyte includes an electrolytic solution and a polymer compound holding the electrolytic solution, and in the gel electrolyte, the polymer compound holds the electrolytic solution to gelatinize the electrolytic solution. As the polymer compound, for example, a fluoropolymer such as a compolymer including polyvinylidene fluoride or vinylidene fluoride and hexafluoropropylene as components, or an ether-based polymer such as polyethylene oxide or a cross-link thereof, polyacrylonitrile or the like is cited. Among them, in terms of stability of oxidation-reduction, the fluoropolymer is preferable.

The secondary battery is manufactured by the following steps, for example.

At first, the cathode active material layer 21B is formed on both sides of the cathode current collector 21A by a vapor-phase method, a liquid-phase method, a spray method, or a combination of two or more kinds selected from them to form the cathode 21. After that, the cathode 21 and the cathode lead 25 are fixed by caulking by the same steps as the above-described steps of manufacturing the electrode structure.

Moreover, by the same steps as the above-described steps of manufacturing the cathode 21, the anode active material layer 22B is formed on both sides of the anode current collector 22A to form the anode 22, and then the anode 22 and the anode lead 26 are fixed by caulking by the same steps as the above-describes steps of manufacturing the electrode structure.

Next, the cathode 21 and the anode 22 are spirally wound with the separator 23 in between to form the spirally wound electrode body 20. In this case, the anode 22 is placed outside. Next, a tip of the cathode lead 25 is welded to the safely valve mechanism 15, and a tip of the anode lead 26 is welded to the battery can 11, and then the spirally wound electrode body 20 sandwiched between a pair of insulating plates 12 and 13 is contained in the battery can 11.

Finally, after the electrolytic solution is injected into the battery can 11 to impregnate the separator 23 with the electrolytic solution, the battery cover 14, the safety valve mechanism 15 and the PTC device 16 are fixed in an opened end portion of the battery can 11 by caulking by the gasket 17. Thereby, the secondary battery shown in FIGS. 21 and 22 is completed.

When the secondary battery is charged, lithium ions are extracted from the cathode 21, and are inserted into the anode 22 through the electrolytic solution. When the secondary battery is discharged, the lithium ions are extracted from the anode 22, and are inserted into the cathode 21 through the electrolytic solution.

In the secondary battery, a combination of the cathode 21 and the cathode lead 25 has the same configuration as that of the above-described electrode structure, so sufficient electrical conduction between them can be obtained. The function can be obtained in not only the cathode 21 and the cathode lead 25 but also a combination of the anode 22 and the anode lead 26 which has the same configuration as that of the above-described electrode structure. Therefore, variations in electrical performance such as capacity characteristics can be prevented to stabilize performance and improve yields.

In the secondary battery, a combination of the cathode 21 and the cathode lead 25, and a combination of the anode 22 and the anode lead 26 have the same configuration as that of the above-described electrode structure; however, they are not necessarily limited to this case, and only either of them has the same configuration as that of the electrode structure. However, when both of them have the same configuration as that of the electrode structure, the electrical conductivity of the whole secondary battery is improved, so a higher effect can be obtained.

EXAMPLES

Examples of the invention will be described in detail below.

Examples 1-1 to 1-4

Figure 23:
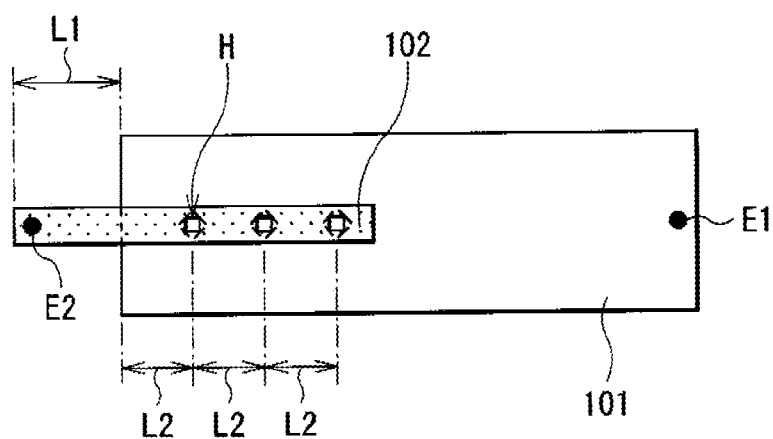
FIG. 23 is a plan view showing the configuration of an electrode structure for evaluation.

Electrode structures were formed by the steps described in the first embodiment (refer to FIGS. 3 to 8). FIG. 23 shows the configuration of an electrode structure for evaluation, and shows a plan view corresponding to FIG. 1A. In this case, the electrode structure had a configuration shown in FIG. 23 instead of FIGS. 1A and 1B.

When each of the electrode structures was formed, after a current collector made of strip-shaped electrolytic copper foil (with a thickness of 18 µm, a length of 50 mm and a width of 15 mm), and an electrode lead 102 made of strip-shaped nickel foil (with a thickness of 50 µm, a length of 38 mm and a width of 4 mm) were prepared, at first, silicon was deposited on both sides of the current collector by an electron beam heating vacuum evaporation method to form an active material layer, thereby an electrode 101 was formed. In this case, the thickness of the active material layer on one side of the current collector was changed among four values (4 µm, 6 µm, 8 µm and 10 µm).

Next, after the electrode 101 was fixed by the lower retaining plate 3 and the upper retaining plate 4, an electrode lead 102 was inserted into the slit 4S formed in the upper retaining plate 4 to be placed on the electrode 101. In this case, the electrode 101 and the electrode lead 102 were partially overlapped in a longitudinal direction, and a projected length L1 of the electrode lead 102 was 10 mm. Next, after the electrode lead 102 was fixed by the lead retainer 5, the punching needle 6 penetrated the electrode lead 102 and the electrode 101 in this order to form the hole H, thereby they were folded around the hole H in the penetrating direction so that the electrode 101 was placed inside. In this case, the outer diameter of the punching needle 6 was 1 mm, and the three-dimensional shape of the tip portion 6P was a square pyramid, and the forming number of the holes H was three, and a space L2 between the holes H was 5 mm.

Next, with the punching needle 6 passing through the hole H, the first press was applied to the electrode 101 and the electrode lead 102 through the use of the caulking punch 7, thereby folded portions of the electrode 101 and the electrode lead 102 were folded back in a direction away from the hole H. In this case, the first press pressure was 1 kN. Finally, after the punching needle 6 was taken out of the hole H, the second press was applied to the electrode 101 and the electrode lead 102 through the use of the lower pressing plate 8 and the upper pressing plate 9. In this case, the second press pressure was 4 kN. Thereby, the electrode 101 and the electrode lead 102 were fixed by caulking at three points (a caulking point number of 3), and the electrode structure with a configuration corresponding to the configuration shown in FIGS. 1A and 1B was completed.

Comparative Examples 1-1 to 1-4

Electrode structures were formed as in the case of Examples 1-1 to 1-4, except that they were formed by the steps described as the comparative example in the first embodiment (refer to FIG. 9). In other words, after the punching needle 6 was taken out of the hole H, the first press was applied.

When electrical resistance characteristics of the electrode structures of Examples 1-1 to 1-4 and Comparative Examples 1-1 to 1-4 were examined, results shown in Table 1 were obtained. To examine the electrical resistance characteristics, after an electrical resistance value (mΩ) between an end E1 of the electrode 101 and an end E2 of the electrode lead 102 was measured by a four-terminal measurement method, the average thereof (an average resistance value) was determined. In this case, the sampling number (a so-called number n) was 20.

The same steps were used to examine the electrical resistance characteristics of the following series of examples and comparative examples.

TABLE 1

| | THICKNESS OF ACTIVE MATERIAL LAYER (μm) | AVERAGE RESISTANCE VALUE (mΩ) |
|---|---|---|
| EXAMPLE 1-1 | 4 | 7.315 |
| EXAMPLE 1-2 | 6 | 7.340 |
| EXAMPLE 1-3 | 8 | 7.350 |
| EXAMPLE 1-4 | 10 | 7.365 |
| COMPARATIVE EXAMPLE 1-1 | 4 | 12.525 |
| COMPARATIVE EXAMPLE 1-2 | 6 | 12.690 |
| COMPARATIVE EXAMPLE 1-3 | 8 | 13.010 |
| COMPARATIVE EXAMPLE 1-4 | 10 | 13.130 |

As shown in Table 1, in Examples 1-1 to 1-4, the average resistance value in each thickness of the active material layer was lower than that in Comparative Examples 1-1 to 1-4. In this case, in particular, as the thickness of the active material layer was increased, in Comparative Examples 1-1 to 1-4, the average resistance value was largely increased; however, in Examples 1-1 to 1-4, the average resistance value was substantially constant. It was shown from the results that the electrode 101 and the electrode lead 102 were caulked more sufficiently in Examples 1-1 to 1-4 than in Comparative Examples 1-1 to 1-4, so the electrical conductivity between them was improved. Therefore, it was confirmed that in the electrode structure according to the first embodiment of the invention, the electrical conductivity was stably improved, and the effect could be obtained even if the thickness of the active material layer was changed.

Examples 2-1, 2-2

Electrode structures were formed by the same steps as those in Examples 1-1 to 1-4, except that the thickness of the active material layer was 5 μm, and the thickness of the current collector was changed between two values (15 μm and 18 μm).

Comparative Examples 2-1, 2-2

Electrode structures were formed by the same steps as those in Examples 2-1 and 2-2, except that as in the case of Comparative Examples 1-1- to 1-4, after the punching needle 6 was taken out of the hole H, the first press was applied.

When the electrical resistance characteristics of the electrode structures of Examples 2-1 and 2-2 and Comparative Examples 2-1 and 2-2 were examined, results shown in Table 2 were obtained.

TABLE 2

| | THICKNESS OF CURRENT COLLECTOR (μm) | AVERAGE RESISTANCE VALUE (mΩ) |
|---|---|---|
| EXAMPLE 2-1 | 15 | 7.475 |
| EXAMPLE 2-2 | 18 | 7.320 |
| COMPARATIVE EXAMPLE 2-1 | 15 | 12.780 |
| COMPARATIVE EXAMPLE 2-2 | 18 | 12.610 |

As shown in Table 2, in Examples 2-1 and 2-2, the average resistance values were substantially constant. The average resistance values in Comparative Examples 2-1 and 2-2 were substantially the same, and the average resistance values in Examples 2-1 and 2-2 were lower than those in Comparative Examples 2-1 and 2-2. Therefore, it was confirmed that in the electrode structure according to the first embodiment of the invention, even if the thickness of the current collector was changed, the electrical conductivity was stably improved.

Examples 3-1 to 3-16

Electrode structures were formed by the same steps as those in Examples 1-1 to 1-4, except that the thickness of the active material layer was 5 μm, and each of the first press pressure and the second press pressure was changed among four values (1 kN, 2 kN, 3 kN and 4 kN), thereby different combinations of the first press pressure and the second press pressure were applied.

When the electrical resistance characteristics of the electrode structures of Examples 3-1 to 3-16 were examined, results shown in Table 3 were obtained.

TABLE 3

| | FIRST PRESS PRESSURE (kN) | SECOND PRESS PRESSURE (kN) | AVERAGE RESISTANCE VALUE (mΩ) |
|---|---|---|---|
| EXAMPLE 3-1 | 1 | 1 | 8.83 |
| EXAMPLE 3-2 | | 2 | 7.79 |
| EXAMPLE 3-3 | | 3 | 7.30 |
| EXAMPLE 3-4 | | 4 | 7.35 |
| EXAMPLE 3-5 | 2 | 1 | 8.59 |
| EXAMPLE 3-6 | | 2 | 8.07 |
| EXAMPLE 3-7 | | 3 | 7.35 |
| EXAMPLE 3-8 | | 4 | 7.30 |
| EXAMPLE 3-9 | 3 | 1 | 8.05 |
| EXAMPLE 3-10 | | 2 | 8.04 |
| EXAMPLE 3-11 | | 3 | 7.38 |
| EXAMPLE 3-12 | | 4 | 7.30 |
| EXAMPLE 3-13 | 4 | 1 | 7.63 |
| EXAMPLE 3-14 | | 2 | 7.95 |
| EXAMPLE 3-15 | | 3 | 7.34 |
| EXAMPLE 3-16 | | 4 | 7.31 |

As shown in Table 3, in Examples 3-1 to 3-4, there was a tendency that as the second press pressure was increased, the average resistance value declined. The same tendency was shown in Example 3-5 to 3-16 in which the first press pressure was different. Moreover, in Examples 3-1 to 3-16, as the first press pressure was increased, the average resistance value declined. In this case, in particular, when the second press pressure was 3 kN or more, the average resistance values were substantially constant. Therefore, it was confirmed that in the electrode structure according to the first embodiment of the invention, even if the first press pressure and the second press pressure were changed, the electrical conductivity was stably improved, and when the both press pressures were increased, the effect was improved.

Examples 4-1 to 4-5

Electrode structures were formed by the same steps as those in Examples 1-1 to 1-4, except that the thickness of the active material layer was 5 μm, and the caulking point number was changed among 5 values (1 point, 2 points, 3 points, 4 points and 5 points). In the case where the caulking point number was changed, while the length of the electrode lead 102 was fixed, the space L2 between holes H was adjusted.

When the electrical resistance characteristics of the electrode structures of Examples 4-1 to 4-5 were examined, results shown in Table 4 were obtained.

TABLE 4

|  | CAULKING POINT NUMBER (POINT) | AVERAGE RESISTANCE VALUE (mΩ) |
| --- | --- | --- |
| EXAMPLE 4-1 | 1 | 8.79 |
| EXAMPLE 4-2 | 2 | 7.39 |
| EXAMPLE 4-3 | 3 | 7.29 |
| EXAMPLE 4-4 | 4 | 7.36 |
| EXAMPLE 4-5 | 5 | 7.49 |

As shown in Table 4, in Examples 4-1 to 4-5, there was a tendency that as the caulking point number was increased, the average resistance value declined in the most cases. In this case, in particular, when the caulking point number was 2 points or more, the average resistance value was substantially constant. Therefore, it was confirmed that in the electrode structure according to the first embodiment of the invention, even if the caulking point number was changed, the electrical conductivity was stably improved, and when the caulking point number was increased, the effect was improved.

Examples 5

An electrode structure was formed by the same steps as those in Examples 1-1 to 1-4, except that the thickness of the active material layer was 5 μm, and the outer diameter of the punching needle 6 was changed to 1.5 mm.

Comparative Example 3

An electrode structure was formed by the same steps as those in Example 5, except that as in the case of Comparative Examples 1-1 to 1-4, after the punching needle 6 was taken out of the hole H, the first press was applied.

When the electrical resistance characteristics of the electrode structures of Example 5 and Comparative Example 3 were examined, results shown in Table 5 were obtained. In Table 5, the results of Example 2-2 and Comparative Example 2-2 are also shown.

TABLE 5

|  | OUTER DIAMETER OF PUNCHING NEEDLE (mm) | AVERAGE RESISTANCE VALUE (mΩ) |
| --- | --- | --- |
| EXAMPLE 2-2 | 1.0 | 7.32 |
| EXAMPLE 5 | 1.5 | 7.56 |
| COMPARATIVE EXAMPLE 2-2 | 1.0 | 12.61 |
| COMPARATIVE EXAMPLE 3 | 1.5 | 10.13 |

As shown in Table 5, in Examples 2-2 and 5, the average resistance values were substantially constant. In Examples 2-2 and 5, the average resistance values were lower than those in Comparative Examples 2-2 and 3. In this case, in particular, in Comparative Examples 2-2 and 3, when the outer diameter of the punching needle 6 was increased, the average resistance value declined. It was considered from the results that when the outer diameter of the punching needle 6 was increased, the lengths (areas) of the folded portions of the electrode 101 and the electrode lead 102 were increased, so the resistance value declined. Therefore, it was confirmed that in the electrode structure according to the first embodiment of the invention, even if the outer diameter of the punching needle 6 was changed, the electrical conductivity was stably improved.

Example 6

An electrode structure for evaluation shown in FIG. 23 was formed by the steps described in the second embodiment (referring to FIGS. 12 to 16).

When the electrode structure was formed, after the electrode 101 was formed, at first, the opening 1K was formed close to the center of the electrode 101 by a YAG laser. In this case, the laser output was 1.7 W, and the internal diameter of the opening 1K was 0.8 mm. Next, after the electrode 101 was fixed by the lower retaining plate 3 and the upper retaining plate 4, the electrode lead 102 was placed on the electrode 101, and was fixed by the lead retainer 5. Next, the punching needle 6 penetrated the electrode lead 102 and the electrode 101 in this order so as to pass through the opening 1K arranged in the electrode 101, thereby the hole H was formed, and then they were folded around the hole H in the penetrating direction so that the electrode 101 was placed inside. Next, after the punching needle 6 was taken out of the hole H, the first press was applied to the electrode 101 and the electrode lead 102 by the caulking punch 7 so that the electrode lead 102 and the electrode 101 were folded back in a direction away from the hole H. Finally, the second press was applied to the electrode 101 and the electrode lead 102 by the lower pressing plate 8 and the upper pressing plate 9. Thereby, the electrode 101 and the electrode lead 102 were fixed by caulking to complete the electrode structure having a configuration corresponding to the configuration shown in FIG. 11. The same steps and conditions as those in Examples 1-1 to 1-4 were used except for the above-described steps and conditions.

Example 7

An electrode structure for evaluation shown in FIG. 23 was formed by the steps described in the third embodiment (refer to FIGS. 17 to 20).

When the electrode structure was formed, at first, after the electrode 101 was fixed by the lower retaining plate 3 and the upper retaining plate 4, the electrode lead 102 was placed below the electrode 101, and fixed by the lead retainer 5. Next, the punching needle 6 penetrated the electrode 101 and the electrode lead 102 in this order to form the hole H, thereby they were folded around the hole H in the penetrating direction so that the electrode lead 102 was placed inside. Next, after the punching needle 6 was taken out of the hole H, the first press was applied to the electrode 101 and the electrode lead 102 by the caulking punch 7 so that the electrode 101 and the electrode lead 102 were folded back in a direction away from the hole H. Finally, the second press was applied to the electrode 101 and the electrode lead 102 by the lower pressing plate 8 and the upper pressing plate 9. Thereby, the electrode 101 and the electrode lead 102 were fixed by caulking, and then the electrode structure with a configuration corresponding to the configuration shown in FIG. 16 was completed. The same steps and conditions as those in Examples 1-1 to 1-4 were used except for the above-described steps and conditions.

When the electrical resistance characteristics of the electrode structures of Examples 6 and 7 were examined, results shown in Table 6 were obtained. In Table 6, the results of Example 2-2 and Comparative Example 2-2 were also shown.

TABLE 6

| | AVERAGE RESISTANCE VALUE (mΩ) |
|---|---|
| EXAMPLE 2-2 | 7.32 |
| EXAMPLE 6 | 7.56 |
| EXAMPLE 7 | 8.05 |
| COMPARATIVE EXAMPLE 2-2 | 12.61 |

As shown in Table 6, in Examples 6 and 7, as in the case of Example 2-2, the average resistance values were lower than that in Comparative Example 2-2. In this case, in particular, the average resistance values declined in order of Examples 7, 6 and 2-2. Therefore, it was confirmed that in the electrode structures according to the second and third embodiments of the invention, as in the case of the electrode structure according to the first embodiment of the invention, the electrical conductivity was stably improved. Moreover, it was confirmed that the above-described effect was improved in the order of the third, second and first embodiments.

Examples 8-1 to 8-4

Cylindrical secondary batteries shown in FIGS. 21 and 22 were formed using the electrode structure of Example 2-2 as the anode 22 and anode lead 26 by the following steps, and then the secondary batteries were charged and discharged.

At first, the cathode 21 was formed. In this case, after lithium carbonate ($Li_2CO_3$) and cobalt carbonate ($CoCO_3$) were mixed at a molar ratio of 0.5:1, the mixture was fired in air at 900° C. for 5 hours to obtain lithium cobalt complex oxide ($LiCoO_2$). Next, after 92 parts by weight of the lithium cobalt complex oxide (with an average particle diameter of 5 μm), 3 parts by weight of carbon black as an electrical conductor and 5 parts by weight of polyvinylidene fluoride as a binder were mixed to form a cathode mixture, the cathode mixture was dispersed in N-methyl-2-pyrrolidone as a solvent to form paste-form cathode mixture slurry. Next, after the cathode mixture slurry was uniformly applied to both sides of the strip-shaped cathode current collector 21A made of aluminum foil (with a thickness of 15 μm), and dried, the cathode mixture slurry was compression molded by a roller press to form the cathode active material layer 21B. After that, the cathode lead 25 made of aluminum was welded to an end of the cathode current collector 21A.

Next, each of the secondary batteries was assembled. In this case, at first, after the separator 23 (with a thickness of 23 μm) was prepared, and the cathode 21 and the anode 22 were laminated with the separator 23 in between to form a laminate, the laminate was spirally wound several times to form the spirally wound electrode body 20. As the separator 23, a three-layer structure in which a central film including porous polyethylene as a main component was sandwiched between films including porous polypropylene as a main component was used. Next, after the cathode lead 25 was welded to the safety valve mechanism 15, and the anode lead 26 was welded to the battery can 11, the spirally wound electrode body 20 sandwiched between a pair of insulating plates 12 and 13 was contained in the battery can 11 made of nickel-plated iron. Next, the electrolytic solution was injected into the battery can 11 by a decompression method to impregnate the separator 23 with the electrolytic solution. In this case, as the electrolytic solution, an electrolytic solution formed by mixing ethylene carbonate and dimethyl carbonate at a weight ratio of 1:1 to form a solvent, and then dissolving lithium hexafluorophosphate as an electrolyte salt in the solvent so that the concentration of the electrolyte salt was 1 mol/dm³ was used. Finally, the safety valve mechanism 15, the PTC device 16 and the battery cover 14 were fixed by caulking the battery can 11 by the gasket 17 coated with asphalt. Thereby, hermeticity in the battery can 11 was secured, and the cylindrical secondary battery (a lithium-ion secondary battery) in which the capacity of the anode 22 was represented by a capacity component by insertion and extraction of lithium was completed.

Finally, each of the secondary batteries was charged and discharged, and the charge-discharge cycle number was changed among four numbers (0 cycle, 2 cycles, 100 cycles and 200 cycles). The charge-discharge conditions (in an environment of 25° C.) are as follows. In the first cycle, the secondary battery was charged at a constant current density of 0.2 mA/cm² until the battery voltage reached 4.2 V, and was further charged at a constant voltage of 4.2 V until the current density reached 0.05 mA/cm², and then the secondary battery was discharged at a constant current density of 0.2 mA/cm² until the battery voltage reached 2.5 V. Moreover, in the second cycle or later, the secondary battery was charged at a constant current density of 2 mA/cm² until the battery voltage reached 4.2 V, and was further charged at a constant voltage of 4.2 V until the current density reached 0.1 mA/cm², and then the secondary battery was discharged at a constant current density of 2 mA/cm² until the battery voltage reached 2.5 V.

Comparative Examples 4-1 to 4-4

Secondary batteries were formed by the same steps as those in Examples 8-1 to 8-4, except that an electrode structure formed by the following steps was used as the anode 22 and the anode lead 26. When the electrode structure was formed, the active material layer of the electrode 101 was polished by a grinder to expose the current collector, and then the electrode lead 102 was bonded to an exposed surface of the current collector by a resistance welding method.

When the electrical resistance characteristics between the cathode 21 and the anode 22 in the secondary batteries of Examples 8-1 to 8-4 and Comparative Examples 4-1 to 4-4 were examined, results shown in Table 7 were obtained. When the electrical resistance characteristics were examined, after the impedance values (mΩ) of a plurality of samples (The number n=20) was measured, and then the average (an average impedance value) was determined.

TABLE 7

| | BONDING METHOD | CHARGE-DISCHARGE CYCLE NUMBER (CYCLE) | AVERAGE IMPEDANCE VALUE (mΩ) |
|---|---|---|---|
| EXAMPLE 8-1 | CAULKING | 0 | 107.07 |
| EXAMPLE 8-2 | | 2 | 71.50 |
| EXAMPLE 8-3 | | 100 | 86.19 |
| EXAMPLE 8-4 | | 200 | 126.50 |
| COMPARATIVE EXAMPLE 4-1 | RESISTANCE WELDING | 0 | 114.30 |
| COMPARATIVE EXAMPLE 4-2 | | 2 | 78.67 |
| COMPARATIVE EXAMPLE 4-3 | | 100 | 103.80 |
| COMPARATIVE EXAMPLE 4-4 | | 200 | 141.20 |

As shown in Table 7, the average impedance values in Examples 8-1 to 8-4 were substantially the same as those in Comparative Examples 4-1 to 4-4 in each charge-discharge cycle number, and to be exact, the average impedance values in Examples 8-1 to 8-4 were lower than those in Comparative Examples 4-1 to 4-4, respectively. It was shown from the results that in Examples 8-1 to 8-4, even though the caulking method in which the electrode lead 102 was not directly bonded to the current collector for form's sake was used, the impedance value declined as low as the impedance value in the case where the resistance welding method in which the electrode lead 102 was directly bonded to the current collector was used. Therefore, it was confirmed that in the secondary battery according to the invention, sufficient electrical conductivity could be obtained.

Although the present invention is described referring to the embodiments and the examples, the invention is not limited to the embodiments and the examples, and can be variously modified. For example, the application of the electrode structure of the invention is not limited to the battery, and the electrode structure may be applied to any other electrochemical devices in addition to the battery. As the other application, for example, a capacitor or the like is cited.

Moreover, in the above-described embodiments and the above-described examples, as the kind of the battery, the lithium-ion secondary battery in which the capacity of the anode is represented by a capacity component by insertion and extraction of lithium is described; however, the invention is not limited to this. The battery of the invention can be applied to a secondary battery in which the charge capacity of an anode material capable of inserting and extracting lithium is smaller than the charge capacity of a cathode, thereby the capacity of an anode includes a capacity component by insertion and extraction of lithium and a capacity component by precipitation and dissolution of lithium, and is represented by the sum of them in the same manner.

Further, in the above-described embodiments and the above-described examples, the case where the battery has a cylindrical type is described as an example; however, the battery of the invention can be applied to a battery with any other shape such as a prismatic type or a laminate film type in which a cathode and an anode spirally wound are used in the same manner. The laminate film type has a configuration in which a spirally wound electrode body is contained in a film-shaped package member. Further, the invention can be applied to not only the secondary batteries but also other kinds of batteries such as primary batteries.

In the above-described embodiments and the above-described examples, the case where lithium is used as an electrode reactant is described; however, any other Group 1A element such as sodium (Na) or potassium (K), a Group 2A element such as magnesium (Mg) or calcium (Ca), or any other light metal such as aluminum may be used. Also in these cases, as the anode active material, the anode material described in the above-described embodiments can be used.

It should be understood by those skilled in the art that various modifications, combinations, sub-combinations and alterations may occur depending on design requirements and the other factors insofar as they are within the scope of the appended claims or the equivalents thereof.

What is claimed is:

1. An electrode structure comprising:
   an electrode including an current collector and an active material layer on the current collector;
   an electrode lead on the active material layer; and
   a hole penetrating through the electrode and the electrode lead such that edges of the hole are defined by folded back portions that are laminates comprised of the electrode and the electrode lead that are folded back away in a direction away from the hole in two folds,
   wherein,
   for each folded back portion, a first of the two folds directs the laminate parallel to an axis of the hole and a second of the two folds directs the laminate perpendicular to the axis of the hole so that the laminate is folded back on itself such that the electrode lead is electrically connected to the electrode along a depth of the hole, and
   for each folded back portion, the thickness of the active material layer in a region where the electrode lead is folded back is substantially uniform, and the thickness of the active material layer in a region where the electrode lead is folded back is substantially not uniform.

2. The electrode structure according to claim 1, wherein in a region where the electrode lead is folded back, the current collector is partially exposed from the active material layer to make contact with the electrode lead.

3. The electrode structure according to claim 1, wherein a tip of a folded-back portion of the electrode lead is positioned closer to the hole than a tip of a folded-back portion of the electrode.

4. The electrode structure according to claim 1, wherein the electrode lead is electrically connected to the electrode at a top end of the hole and at a bottom end of the hole.

5. The electrode structure according to claim 1, wherein the electrical connection is continuous from a top end of the hole to a bottom end of the hole.

6. The electrode structure according to claim 1, wherein the electrode lead is electrically connected to the electrode throughout the direction away from the hole in the two folds.

7. The electrode structure according to claim 1, wherein the electrode lead is electrically connected to the electrode throughout the fold back.

8. An electrode structure comprising:
   an electrode including a current collector and an active material layer on the current collector;
   an electrode lead on the active material layer; and
   a hole penetrating through the electrode and the electrode lead such that edges of the hole are defined by folded back portions that are laminates comprised of the electrode and the electrode lead that are folded back away in a direction away from the hole in two folds,
   wherein,
   for each folded back portion, a first of the two folds directs the laminate parallel to an axis of the hole and a second of the two folds directs the laminate perpendicular to the axis of the hole so that the laminate is folded back on itself such that the electrode lead is electrically connected to the electrode along a depth of the hole, and
   for at least one folded-back portion a tip of a folded-back portion of the electrode extends beyond a tip of a folded-back portion of the electrode lead.

9. A battery comprising:
   an electrode structure; and
   an electrolytic solution,
   wherein the electrode structure includes
   (a) an electrode including an current collector and an active material layer on the current collector,
   (b) an electrode lead on the active material layer, and
   (c) a hole penetrating through the electrode and the electrode lead such that edges of the hole are defined by folded back portions that are laminates comprised of the electrode and the electrode lead that are folded back away in a direction away from the hole in two folds, and wherein
   (a) for each folded back portion, a first of the two folds directs the laminate parallel to an axis of the hole and a second of the two folds directs the laminate perpendicular to the axis of the hole so that the laminate is folded back on itself such that the electrode lead is electrically connected to the electrode along a depth of the hole, and (b) for each folded back portion, the thickness of the active material layer in a region where the electrode lead is not arranged folded back is substantially uniform, and the thickness of the active material layer in a region where the electrode lead is arranged folded back is substantially not uniform.

10. A battery comprising:
an electrode structure; and
an electrolytic solution,
wherein the electrode structure includes
- (a) an electrode including an current collector and an active material layer on the current collector, and
- (b) an electrode lead on the active material layer, and
- (c) a hole penetrating through the electrode and the electrode lead such that edges of the hole are defined by folded back portions that are laminates comprised of the electrode and the electrode lead that are folded back away in a direction away from the hole in two folds, and wherein
- (a) for each folded back portion, a first of the two folds directs the laminate parallel to an axis of the hole and a second of the two folds directs the laminate perpendicular to the axis of the hole so that the laminate is folded back on itself such that the electrode lead is electrically connected to the electrode along a depth of the hole, and
- (b) for at least one folded-back portion a tip of a folded-back portion of the electrode extends beyond a tip of a folded-back portion of the electrode lead.

* * * * *